United States Patent
Kurumida et al.

(10) Patent No.: US 7,139,484 B2
(45) Date of Patent: Nov. 21, 2006

(54) SIGNAL TRANSMISSION METHOD IN WDM TRANSMISSION SYSTEM, AND WDM TERMINAL, OPTICAL ADD-DROP MULTIPLEXER NODE, AND NETWORK ELEMENT USED IN THE SAME SYSTEM

(75) Inventors: Junya Kurumida, Kawasaki (JP); Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 671 days.

(21) Appl. No.: 10/303,288

(22) Filed: Nov. 25, 2002

(65) Prior Publication Data

US 2003/0185567 A1  Oct. 2, 2003

(30) Foreign Application Priority Data

Apr. 1, 2002  (JP) .............................. 2002-099047

(51) Int. Cl.
    *H04J 14/02* (2006.01)
(52) U.S. Cl. .............................. 398/83; 398/79; 398/5; 398/15; 398/91; 398/30; 398/31; 398/33; 398/140; 398/141; 398/151; 398/95; 385/24; 385/37
(58) Field of Classification Search .................. 398/79, 398/83, 91, 5, 30, 31, 33, 140, 141, 151, 398/95, 15; 385/24, 37
See application file for complete search history.

(56) References Cited

U.S. PATENT DOCUMENTS

| | | | |
|---|---|---|---|
| 5,438,445 A | 8/1995 | Nakano | |
| 5,724,166 A * | 3/1998 | Nakata | 398/61 |
| 6,310,708 B1 | 10/2001 | Ota et al. | |
| 6,583,901 B1 * | 6/2003 | Hung | 398/79 |
| 6,944,401 B1 * | 9/2005 | Olier et al. | 398/94 |
| 2003/0095303 A1 * | 5/2003 | Cunningham et al. | 359/110 |

FOREIGN PATENT DOCUMENTS

| | | |
|---|---|---|
| EP | 0 820 166 | 1/1998 |
| WO | WO 99/65174 | 12/1999 |
| WO | WO 02/15451 | 2/2002 |

OTHER PUBLICATIONS

European Search Report dated Mar. 6, 2006.
Communication pursuant to Article 96(2) EPC dated Jul. 13, 2006.

* cited by examiner

*Primary Examiner*—Nanh Phan
(74) *Attorney, Agent, or Firm*—Katten Muchin Rosenman LLP

(57) ABSTRACT

Disclosed herein is a signal transmission method in a wavelength-division-multiplex (WDM) transmission system. The WDM transmission system comprises a first WDM terminal for transmitting a WDM signal, a second WDM terminal for receiving the WDM signal, and an optical add-drop multiplexer (OADM) node for transmitting to a network element an optical signal of a specific wavelength of the WDM signal which is transmitted between the first and second WDM terminals. The WDM signal is transmitted from the first WDM terminal to the second WDM terminal regardless of whether an optical signal is added or dropped at the OADM node. The network element employs an optical signal of an idle wavelength of the WDM signal that has no transmission data, to transmit another transmission data that is transmitted by the network element.

47 Claims, 20 Drawing Sheets

SIGNAL TRANSMISSION METHOD IN WDM TRANSMISSION SYSTEM, AND WDM TERMINAL, OPTICAL ADD-DROP MULTIPLEXER NODE, AND NETWORK ELEMENT USED IN THE SAME SYSTEM

BACKGROUND OF THE INVENTION (1) Field of the Invention

The present invention generally relates to a wavelength-division-multiplex (WDM) transmission technique, and more particularly to a technique suitable for use in a WDM transmission system employing optical add-drop multiplexers for optical signals.

(2) Description of the Related Art

It is desirable in the backbone of a network to change communication capacity according to a span between nodes constituting the network. This is because the span between nodes is about 80 km and has a different demand for communication. It is also desirable to allocate multiple wavelengths to a span that has a great demand for communication, because a demand for communication varies with a time zone of a day.

Hence, an optical add-drop multiplexer (hereinafter referred to as an OADM node), capable of increasing or decreasing the number of wavelengths by dropping and adding optical signals, is employed in a WDM transmission system to meet an increase or decrease in traffic between WDM nodes.

A WDM transmission system employing such an OADM node is mainly utilized, for example, in a system with a terminal-opposed structure shown in FIG. 17, a system with a ring structure shown in FIG. 18, etc.

That is, in the system with a terminal-opposed structure shown in FIG. 17, at least one OADM node 103 is disposed on the optical transmission lines 107, 108 between WDM terminals 102, 105. At the OADM node 103, an optical signal of specific wavelength in a wavelength-division-multiplex (WDM) signal received from the WDM terminal (hereinafter referred to simply as the terminal) 102 or 105 is dropped to a network element (NE) 104 belonging to the OADM node 103. An optical signal from the NE 104 is added to the vacant wavelength of the WDM signal generated by dropping the specific wavelength. In this way, communication is performed between the NE 101 (or 106) belonging to the terminal 102 (or 105) and the NE 104 belonging to the OADM node 103.

In the WDM transmission system with a ring structure shown in FIG. 18, a plurality of OADM nodes 103a, 103b, 103c, and 103d are connected in ring form through optical transmission lines (optical fibers). The determination of how optical signals of different wavelengths are dropped and added at different OADM nodes 103a to 103d is made in advance. In this manner, communication is performed between the NEs 104 belonging to different OADM nodes 103a to 103d (hereinafter referred to simply as OADM nodes 103).

In FIG. 18, the solid line between the OADM nodes 103 represents a transmission line for each wavelength of a WDM signal which is transmitted through the above-described optical transmission line 107 (108). The above-described NEs 104 are equivalent to transmitters that are employed in a synchronous digital hierarchy (SDH)/synchronous optical network (SONET), an Ethernet of a gigabit level, etc.

The above-described add-drop OADM node 103 typically has a multiplexing-demultiplexing structure such as that shown in FIG. 19 (constructed by two pairs of wavelength multiplexing-demultiplexing terminals), or a WDM filter structure such as that shown in FIG. 20.

In the former, as shown in FIG. 19, a transmitting system of two-way communication (upper half portion in FIG. 19) includes a first optical amplifier 111, a second optical amplifier 117, a wavelength demultiplexer 112, optical drop couplers 113 corresponding to the number of wavelengths, optical switches 114 corresponding in number to the optical drop couplers 113, optical add couplers 115 corresponding in number to the optical switches 114, a wavelength multiplexer 116, and variable optical attenuators 120 corresponding in number to the optical add couplers 115. Similarly, a receiving system (lower half portion in FIG. 19) includes a first optical amplifier 111, a second optical amplifier 117, a wavelength demultiplexer 112, optical drop couplers 113 corresponding to the number of wavelengths, optical switches 114 corresponding in number to the optical drop couplers 113, optical add couplers 115 corresponding in number to the optical switches 114, a wavelength multiplexer 116, and variable optical attenuators 120 corresponding in number to the optical add couplers 115.

In addition, the above-described transmitting system and receiving system are provided with opto/electric (O/E) converters 121 for handling an optical supervisory channel (OSC), LSIs 122, electro/optical (E/O) converters 123, and spectrum analyzers 124 for a WDM signal, respectively.

In FIG. 19, each of the right and left parts of the OADM 103 with the optical switches 114 as the center is approximately equivalent to the construction of a single terminal that already exists. In addition, as the optical amplifiers, erbium-doped fiber amplifiers (EDFAs) are widely employed. In high-speed communication, a phenomenon (dispersion of wavelength) that the velocity of light varies little by little with wavelength will occur in optical fibers that are employed in the optical amplifiers 111, 117 and optical transmission line 107 (108). To compensate for this phenomenon, there are provided dispersion compensation fibers (DCFs) 118, 119.

In the OADM 103 with such a multiplexing-demultiplexing structure, a WDM signal received through the optical transmission line 107 (108) is first amplified to the required optical signal level by the optical amplifier 111 to compensate for losses which will occur due to the demultiplexing at the optical drop couplers 113. Then, the amplified WDM signal is demultiplexed into optical signals of different wavelengths (channel signals) by the optical demultiplexer 112. Next, an optical signal of a wavelength to be separated is dropped to the NE 104 by the corresponding optical drop coupler 113, and the optical signals of wavelengths other than the dropped wavelength are passed through the optical switches 114.

Note that the demultiplexed optical signals, including the optical signal of a dropped wavelength, are passed through the optical drop couplers 113. However, the optical signal of a dropped wavelength is not passed through to make a vacant wavelength for the addition of an optical signal at the subsequent stage. That is, the optical signal of a wavelength dropped at the self-node 103 is stopped by the corresponding optical switch 114 so that it is not sent to the subsequent stage.

Thus, in the OADM node 103, an optical signal with data transmitted from another NE 104 can be added by the corresponding optical add coupler 115 to a grid that has a vacant wavelength by dropping a selected wavelength. The added optical signal and the above-described optical signals of wavelengths other than the dropped wavelength are incorporated into a WDM signal by the optical multiplexer 116. The WDM signal is again amplified by the optical amplifier 117 to compensate for losses and is transmitted onto the downstream transmission line 107 (108). Note that the addition of an optical signal to a vacant wavelength may be performed at an arbitrary node of the following stage as well as the node 103 that dropped an optical signal of a selected wavelength.

Incidentally, the information about the wavelengths of a WDM signal that is transmitted through the OADM node 102 is being monitored by the spectrum analyzer 124. The wavelength information is fed back to the optical control system of the self-node 102. The information includes measured information such as an optical signal-to-noise ratio (OSNR), amplified spontaneous emission (ASE) light, etc. Based on the information, an optical transmission level, etc., are adjusted so that the state of an optical transmission signal becomes optimum. For instance, the level of an optical signal of a wavelength added is adjusted by adjusting the degree of attenuation of the variable optical attenuator 120.

In addition, according to optical power information obtained from the spectrum of a WDM signal for each node 103, preemphasis control is performed between nodes 103 to reduce a wavelength-dependent characteristic between nodes and ensure stable communication. The above-described monitor control information is transmitted by employing the above-described OSC. In WDM transmission systems, one or more wavelengths are allocated beforehand for the OSC. In each node 103, information transmitted through the OSC is converted into an electrical signal by the above-described O/E converter 121. The electrical signal is analyzed by the LSI 122. Information corresponding to the result of analysis is again converted into an optical signal of the original wavelength by the E/O converter 123 and is transmitted. In this way, the monitor control information can be transmitted through the OSC.

On the other hand, in the OADM node 103 with a WDM filter structure, as shown in FIG. 20, the above-described add-drop function (realized by the optical demultiplexer 112, optical drop couplers 113, optical add couplers 115, optical switches 114, and optical multiplexer 116 shown in FIG. 19) is realized by optical drop couplers 125 corresponding to the number of wavelengths, optical add couplers 126 corresponding to the number of wavelengths, a rejection filter 127, predetermined filters 128 corresponding in number to the optical drop couplers 125, and predetermined filters 129 corresponding in number to the optical add couplers 126.

In such a structure, a received WDM signal from the optical amplifier 111 is demultiplexed by the optical drop couplers 125. Only an optical signal of a wavelength to be dropped is selected by the predetermined filter 128 and is dropped to the NE 104. As in the aforementioned case, the optical signal of the dropped wavelength passed through the optical drop coupler 125 is rejected by the rejection filter 127 to make a vacant wavelength at the following stage.

Thus, an optical signal of the added wavelength equal to the dropped wavelength, and the optical signals of wavelengths other than the dropped wavelength, passed through the rejection filter 127, are incorporated into a WDM signal by the optical add couplers 126. Note that the operation other than the above-described adding-dropping function is the same as the operation described in FIG. 19.

As described above, the conventional WDM transmission systems can meet an increase or decrease in traffic between nodes by the OADM node 103 which has the function of adding and dropping an optical signal through the optical switches 114 or rejection filter 127.

In the existing WDM transmission systems, incidentally, transmission is performed without recognizing the content of information about an optical signal [signal format (protocol), for example, a signal for SDH, SONET, etc., and a signal for Ethernet (R) other than that].

As a result, a direct modulation signal, obtained from a high-speed signal which is handled in high-speed communication networks of a level of gigabits/sec, can be transmitted as it is. Conversely speaking, active control cannot be flexibly performed according to the content of information about an optical transmission signal, and it can also be said that the degree of freedom of the network is not high.

For instance, in a burst communication network where burst communication is performed, such as an Ethernet(R), etc., each of the optical signals (channels) of a WDM signal to be transmitted between the NEs 104 through the OADM node 103 does not always carry information. That is, there is an idle channel having no transmission data, although the channel itself is transmitted. Therefore, if such an idle channel can be utilized to transmit different information, then wavelength resources can be effectively utilized and immediate switching of communication paths, control for changing an add-drop structure, etc., can be flexibly performed according to an increase or decrease in traffic between nodes.

As described above, in the conventional OADM node 103, the wavelength adding-dropping function is realized by the optical switches 114 or rejection filter 127. Because of this, even if there is an idle channel, the channel cannot be utilized in an arbitrary OADM node 103 and the above-described active control cannot be realized. As a result, WDM transmission performance per one channel is not the maximum.

In addition, in the WDM transmission system employing OADM nodes 103, there are wavelengths whose OSNR is sufficient and wavelengths whose OSNR is not sufficient, depending on the number of nodes and the number of wavelengths. Therefore, in the case where a signal is added and dropped, the system becomes complicated, because it must be designed in consideration of the setting of a pass group.

For example, as shown in FIG. 21, in the case where it is assumed that optical signals whose wavelength is small are on a short-wavelength side, an optical signal of wavelength λ2 is passed through 2 spans. Because of this, the OSNR of the optical signal of wavelength λ2 becomes bad, compared with an optical signal of wavelength λ4 which passes through only one span. Such a phenomenon has to be taken into consideration over the entire network. In addition, the main function of the OADM node 103 is to increase or decrease the number of wavelengths to change the quantity of information to be transmitted when traffic is increased or decreased at a certain node 103. When the number of wavelengths is increased or decreased, control must be performed based on the correction information about the OSNR of the node 103 and about ASE light so that the communication state of the entire system becomes optimum.

Because of this, in the WDM transmission system of a ring structure or terminal-opposed structure in the existing WDM backbone, each of the transmitting and receiving systems in each node is provided with the spectrum analyzer 124 to acquire the level of light and the number of wavelengths for each span and optimize the level of light to be added and dropped.

However, if the optical switches 114 or rejection filter 127 is employed in the OADM node 103 to make a vacant wavelength, it looks as if an OSNR were enhanced within the node 103, because ASE light is removed in a narrow band. As a result, if the number of wavelengths is increased or decreased at a certain node 103, the correction information about the OSNR and ASE light will change and have influence on other nodes 103. Therefore, the number of wavelengths cannot be quickly and freely increased or decreased.

In addition, the above-described structure is nearly the same as a structure where two terminals are practically combined. At the same time, the optical signal monitoring system based on the OSC becomes complicated. As a result, even when one or two wavelengths are added and dropped, the expensive OADM node 103 with the spectrum analyzer 124 must be employed. Therefore, cost performance is extremely bad and the cost of the entire system becomes extremely high. In addition, as the size of the system becomes larger, the number of transmissions and receptions of the monitor control information between nodes (basically, information about the number of wavelengths), including preemphasis control, is increased. Therefore, an OSC of large capacity must be prepared and effective utilization of wavelength resources becomes difficult.

Furthermore, if the wavelength adding-dropping function is realized by the optical switches 114 or rejection filter 127, the intensity of light and number of wavelengths for each span are limited. Therefore, once services are carried out, the wavelength adding-dropping structure cannot be changed unless the services are stopped.

SUMMARY OF THE INVENTION

The present invention has been made in view of the problems found in prior art. Accordingly, it is an object of the present invention to achieve a simplification in structure and a reduction in cost of an OADM and accordingly a WDM transmission system by constituting the OADM node without employing optical components such as optical switches, a rejection filer, etc. Another object of the invention is to enhance system performance per 1 channel of a WDM transmission system. Still another object of the invention is to flexibly increase or decrease the number of wavelengths during services.

To achieve the above-described objects of the present invention, there is provided a signal transmission method which is used in a wavelength-division-multiplex (WDM) transmission system. The WDM transmission system comprises a first WDM terminal for transmitting a WDM signal, a second WDM terminal for receiving the WDM signal, and an optical add-drop multiplexer (OADM) node for transmitting to a network element an optical signal of a specific wavelength of the WDM signal which is transmitted between the first and second WDM terminals and for adding to the WDM signal an optical signal of an idle wavelength of the WDM signal received from the network element. In the WDM transmission system, the following steps (1) and (2) are carried out.

(1) The WDM signal is transmitted from the first WDM terminal to the second WDM terminal regardless of whether an optical signal is added or dropped at the OADM node.

(2) The network element transmits adding data from the network element using an optical signal of an idle wavelength of the WDM signal which has no transmission data.

In the signal transmission method of the present invention, the first WDM terminal may stop transmission of an optical signal of an idle wavelength of the WDM signal which has no transmission data. The network element may add second transmission data, which is transmitted by the network element, to an optical signal of the same addition wavelength as an idle wavelength generated by the transmission stop and may transmit the optical signal to the OADM node. The OADM node may add to the WDM signal the optical signal of the addition wavelength output by the network element instead of the optical signal stopped by the first WDM terminal.

The aforementioned first WDM terminal may transmit an optical signal of a wavelength having a predetermined pattern to the second WDM terminal, regardless of whether there is transmission data. The aforementioned network element may receive the optical signal of the idle wavelength from the OADM node and hold the predetermined pattern of the optical signal of the idle wavelength.

Next, the aforementioned network element may transmit the predetermined pattern to the OADM node for a predetermined time by the optical signal of the addition wavelength, before transmission of the adding data. Thereafter, the aforementioned network element may transmit the optical signal of the addition wavelength with the second transmission data to the network element.

In the signal transmission method of the present invention, the aforementioned first WDM terminal may stepwise lower the optical transmission level of the optical signal of the idle wavelength having the predetermined pattern and stops the transmission. The aforementioned network element may stepwise raise the transmission level of the optical signal of the addition wavelength having the predetermined pattern with respect to the OADM node, for the predetermined time.

In the aforementioned network element, an optical signal of an idle wavelength which does not have transmission data to be transmitted by the first WDM terminal, among the WDM signal passed through the OADM node, can be modulated with second transmission data which is transmitted by the network element.

In accordance with the present invention, there is provided a first WDM terminal which is used in the above-described WDM transmission system. The first WDM terminal comprises:

(1) WDM-signal transmission means for transmitting the WDM signal;

(2) transmission control means for stopping transmission of an optical signal of an idle wavelength of the WDM signal which has no transmission data; and (3) transmission-allowance issuing means for allowing the network element to transmit adding data using optical signal of the same addition wavelength as an idle wavelength generated by stopping transmission of the optical signal of the idle wavelength by the transmission control means, and allowing the network element to transmit the optical signal of the addition wavelength to the OADM node.

In accordance with the present invention, there is provided a first OADM node which is used in the above-described WDM transmission system. The first OADM node comprises:

(1) an optical dropping-passing section for dropping one or more optical signals of said WDM signal to be transmitted to said network element and passing the optical signals to the second WDM terminal;

(2) a variable wavelength selecting section for selecting an optical signal of an idle wavelength which does not have transmission data to be transmitted by the first WDM terminal, from the optical signals and for transmitting the selected optical signal to the network element; and (3) an optical-signal adding section for adding an optical signal of the same addition wavelength as the idle wavelength having adding data from the network element, to the WDM signal instead of the optical signal stopped by the first WDM terminal.

In accordance with the present invention, there is provided a second OADM node which is used in the above-described WDM transmission system. The second OADM node comprises:

(1) an optical dropping-passing section for dropping one or more optical signals of said WDM signal to be transmitted to the network element and passing the optical signals to the second WDM terminal;

(2) a variable wavelength selecting section for selecting an optical signal of an idle wavelength which does not have transmission data to be transmitted by the first WDM terminal, from the optical signals and for transmitting the selected optical signal to the network element; and (3) an optical-signal adding section for receiving an optical signal having adding data, added by the network element which receives the optical signal of the idle wavelength from the optical dropping-passing section, and adding the received optical signal to said WDM signal.

In accordance with the present invention, there is provided a first network element that is used in the above-described WDM transmission system. The first network element comprises:

(1) optical-signal receiving means for receiving an optical signal of an idle wavelength of the WDM signal dropped from the OADM node and having no transmission data to be transmitted by the first WDM terminal; and (2) optical-signal transmitting means for transmitting an optical signal to the OADM node, which signal has adding data to be added to the WDM signal and the same addition wavelength as the idle wavelength generated by stopping transmission of the optical signal of the idle wavelength having no transmission data at the first WDM terminal.

In accordance with the present invention, there is provided a second network element that is used in the above-described WDM transmission system. The second network element comprises:

(1) optical-signal receiving means for receiving an optical signal of an idle wavelength of the WDM signal dropped from the OADM node and having no transmission data to be transmitted by the first WDM terminal; and (2) optical-signal transmitting means for adding data to be added to said WDM signal, to the optical signal of the idle wavelength received by the optical-signal receiving means, and for transmitting the optical signal of the idle wavelength to the OADM node.

As set forth in detail, the present invention has the following advantages:

(1) In the WDM transmission system, the WDM signal is transmitted from the first WDM terminal to the second WDM terminal regardless of whether an optical signal is added or dropped at the OADM node. The network element employs an optical signal of an idle wavelength of the WDM signal which has no transmission data, to transmit adding data from the network element. For example, the first WDM terminal stops transmission of an optical signal of an idle wavelength of the WDM signal which has no transmission data. The network element adds another transmission data (adding data) from the network element, to an optical signal of the same addition wavelength as the idle wavelength generated by the transmission stop and may transmit the optical signal to the OADM node. The OADM node adds to the WDM signal the optical signal of the addition wavelength output by the network element instead of the optical signal stopped by the first WDM terminal. As a result, an increase or decrease in the number of wavelengths and transmission line switching can be flexibly performed in accordance with an increase or decrease in traffic between nodes. Therefore, according to traffic, wavelength resources can be effectively utilized, and WDM transmission performance per 1 channel is substantially enhanced.

(2) As described above, the transmission of an optical signal of an idle wavelength which has no transmission data is stopped by the WDM terminal. The OADM node does not need to have a structure for rejecting an optical signal of an idle wavelength. In such a system structure without rejection, transmission loss at each OADM node can be reduced, because the aforementioned optical switches and the aforementioned rejection filter are unnecessary. Therefore, the number of optical components required of the OADM node, and capability to compensate for transmission loss (number of optical amplifiers, etc.), can be reduced. This makes a great contribution to a reduction in cost of the OADM node and the system itself.

(3) As describe above, the OADM node passes an optical signal therethrough. Therefore, the OSNR of the WDM signal can be collectively monitored by the second WDM terminal. As a result, there is no need to provide OSNR monitoring equipment (such as a spectrum analyzer, etc.) in each OADM node. Thus, the size and cost of the OADM node can be further reduced. In addition, since the number of transmissions and receptions of monitor control information is reduced, the capacity for monitor control channels (wavelengths) can be reduced.

(4) Since an optical signal is not rejected at the ODAM node, the setting of a pass group in the WDM transmission system is easy. In addition, even after the start of services, the wavelength adding-dropping structure can also be changed without stopping the services.

(5) The aforementioned network element transmits the predetermined pattern to the OADM node for a predetermined time by the optical signal of the addition wavelength, before transmission of the second transmission data. Thereafter, the aforementioned network element transmits the optical signal of the addition wavelength with the adding data to the network element. Therefore, even if the transmission of an optical signal of an idle wavelength from an upstream is stopped due to the switching of an idle wavelength and an addition wavelength, the time required for the reextraction of a reference transmission clock (establishment of resynchronization) at a communication destination can be reduced.

(6) In the signal transmission method of the present invention, the aforementioned first WDM terminal stepwise lowers the optical transmission level of the optical signal of the idle wavelength having the predetermined pattern and stops the transmission. The aforementioned network element stepwise raises the transmission level of the optical signal of the addition wavelength having the predetermined pattern with respect to the OADM node, for the predetermined time. Therefore, it becomes possible to stepwise (slowly) shift the phase of the synthesized waveform. As a result, the instantaneous phase shift of a reference transmission clock at the time of the switching of an optical signal of an idle wavelength and an optical signal of an addition wavelength can be prevented and it becomes possible to prevent the out-of-synchronism of an optical signal of an addition wavelength. In addition, the above-described predetermined time (during which a predetermined pattern is transmitted before transmission data is actually transmitted) can be prevented from becoming inadvertently long.

(7) When the first WDM terminal stops transmission of an optical signal of an idle wavelength, the first WDM terminal may be provided with a light source which fixedly transmits a prevention signal for continuing transmission even when transmission of optical signals of all wavelengths of the WDM signal is stopped. In this way, the state can be avoided in which optical signals of all wavelengths are not transmitted. Therefore, the WDM transmission system can be operated without having influence on the optical transmission characteristics, and the reliability of the WDM transmission system can be substantially enhanced.

(8) The first WDM terminal can add an optical signal by modulating an optical signal of an idle wavelength with another transmission data (adding data), without stopping transmission of the optical signal of the idle wavelength. In this case, the same advantage as the above-described (1) is obtained. Since the OADM node does not require a light source which emits an optical signal of an addition wavelength, the size and cost of the OADM node can be further reduced.

(9) In this case, the same predetermined pattern as the aforementioned case can be transmitted from the first WDM terminal, and the network element can directly modulate the optical signal of the idle wavelength received from the OADM node, with self-transmission data in synchronization with the predetermined pattern. In this way, the out-of-synchronism of the self-transmission data can be prevented.

(10) When the first WDM terminal receives a plurality of transmission allowance requests about the same idle wavelength from a plurality of network elements, the first WDM terminal selects any of the network elements and gives a transmission allowance of the second transmission data to only the selected network element. In this way, mediation control is performed. This can avoid the situation in which the network element with transmission data cannot perform communication for a long time due to a conflict of busy signals. As a result, the reliability of the WDM transmission system is considerably enhanced.

BRIEF DESCRIPTION OF THE DRAWINGS

The present invention will be described in further detail with reference to the accompanying drawings wherein.

DESCRIPTION OF THE PREFERRED EMBODIMENTS

Embodiments of the present invention will hereinafter be described with reference to the drawings.

(A) Overview

Figure 1:
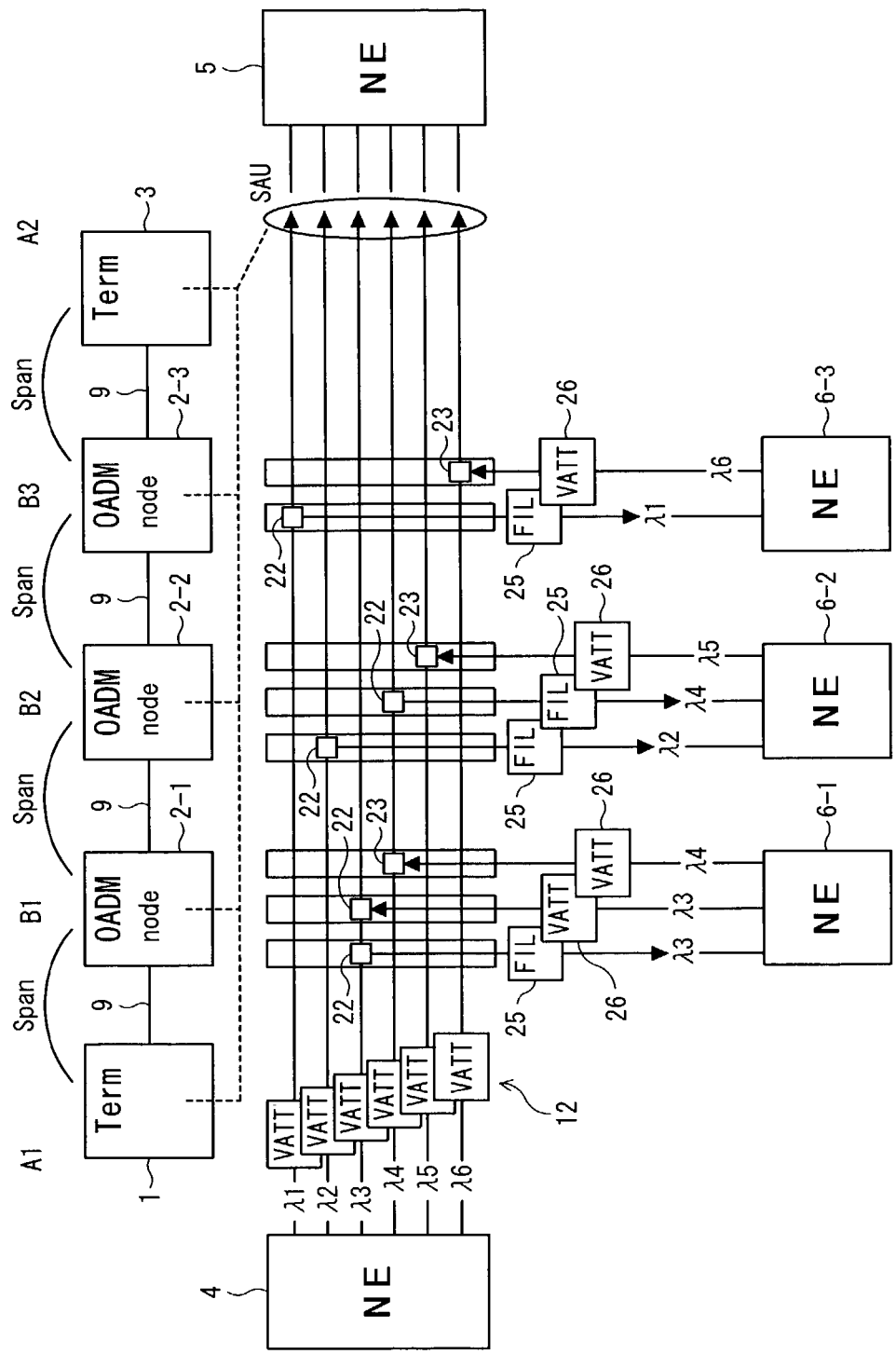
FIG. 1 is a block diagram showing a WDM transmission system constructed in accordance with a first embodiment of the present invention.

FIG. 1 shows a WDM transmission system constructed in accordance with a first embodiment of the present invention. As shown in the figure, the WDM transmission system includes a first WDM terminal 1 and a second WDM terminal 3. The first WDM terminal 1 is connected with a first NE 4. The second WDM terminal 3 is connected with a second NE 5 and provided in opposition to the first WDM terminal 1. The WDM transmission system further includes OADM nodes 2-1, 2-2, and 2-3, and NEs 6-1, 6-2, and 6-3 respectively connected to the OADM nodes 2-1, 2-2, and 2-3. Each of the OADM nodes 2-1, 2-2, and 2-3 performs a wavelength adding-dropping operation on a WDM signal which is transmitted between the first terminal 1 and the second terminal 3. The first terminal 1, the OADM nodes 2-1, 2-2, and 2-3, and the second terminal 3 are connected through an optical transmission line 9 (optical fiber).

Note that in the case where the above-described OADM nodes 2-1, 2-2, 2-3 and NEs 6-1 to 6-3 are not discriminated from one another, they are referred to as simply as OADM nodes 2 and NEs 6. In addition, the number of OADM nodes 2 and NEs 6 that are provided in the transmission system is not limited to the number shown in FIG. 1.

Figure 2:
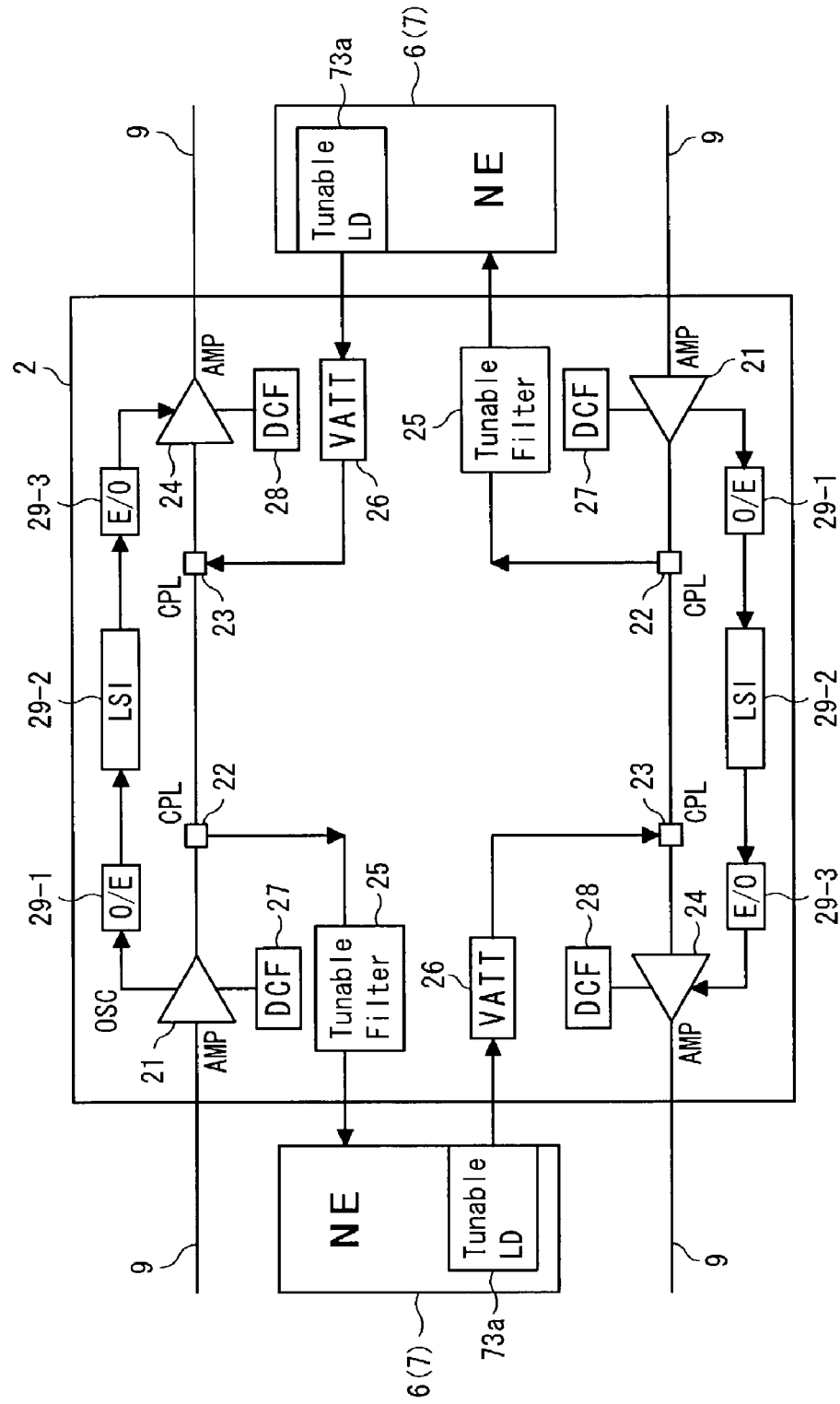
FIG. 2 is a block diagram showing the OADM node shown in FIG. 1.
Figure 19:
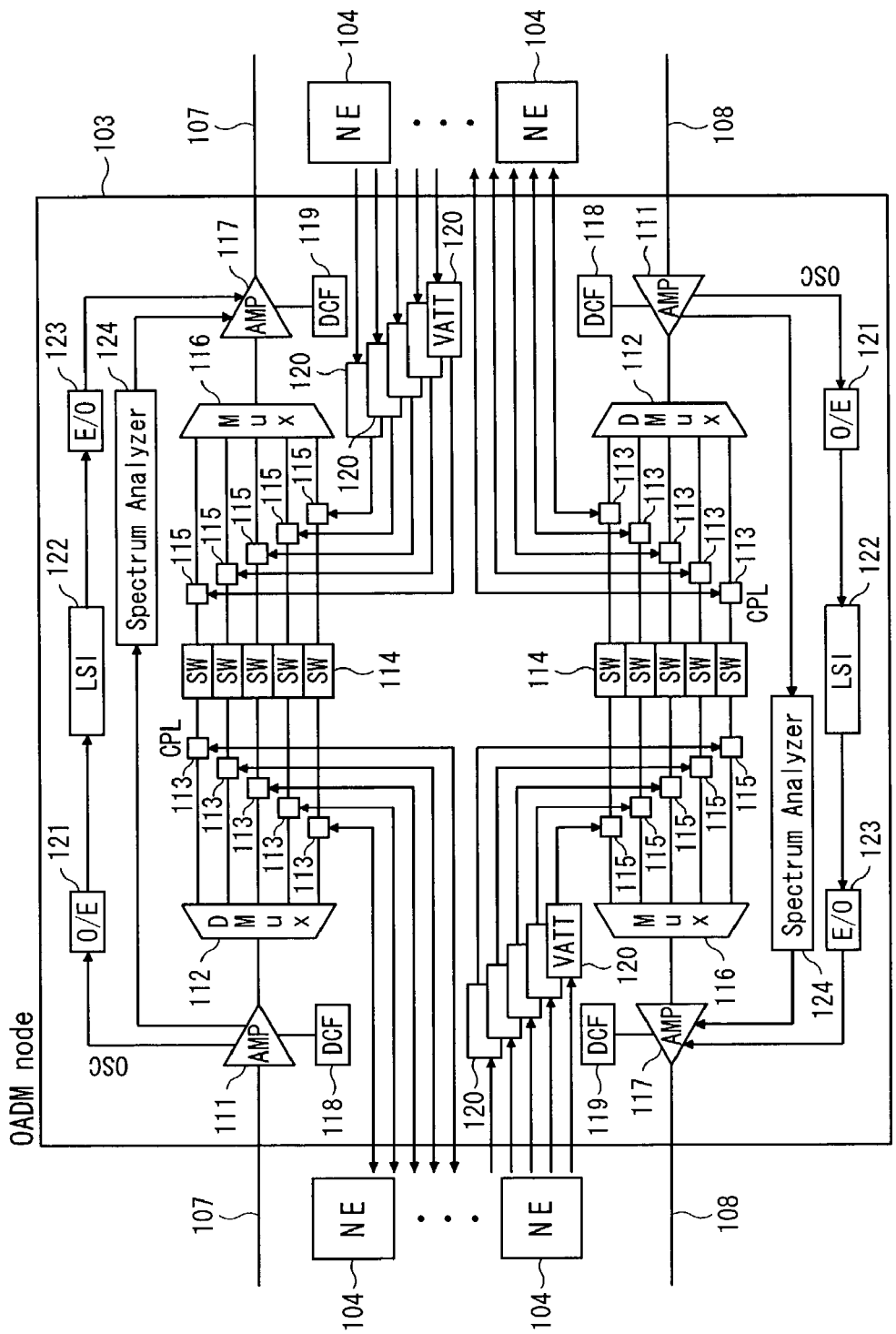
FIG. 19 is a block diagram showing a detailed structure of the OADM node shown in FIGS. 17 and 18.
Figure 20:
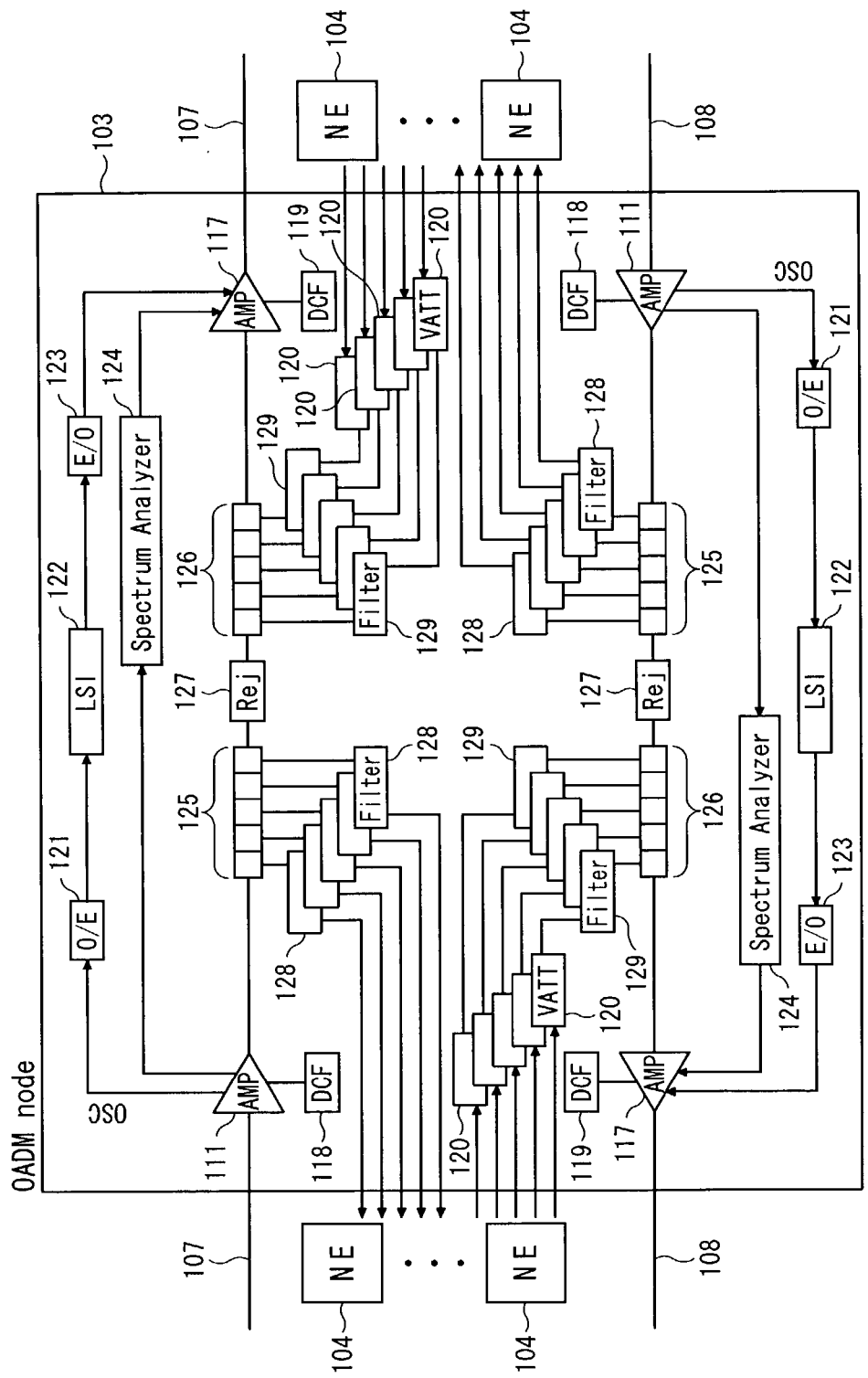
FIG. 20 is a block diagram showing another detailed structure of the OADM node shown in FIGS. 17 and 18.
Figure 21:
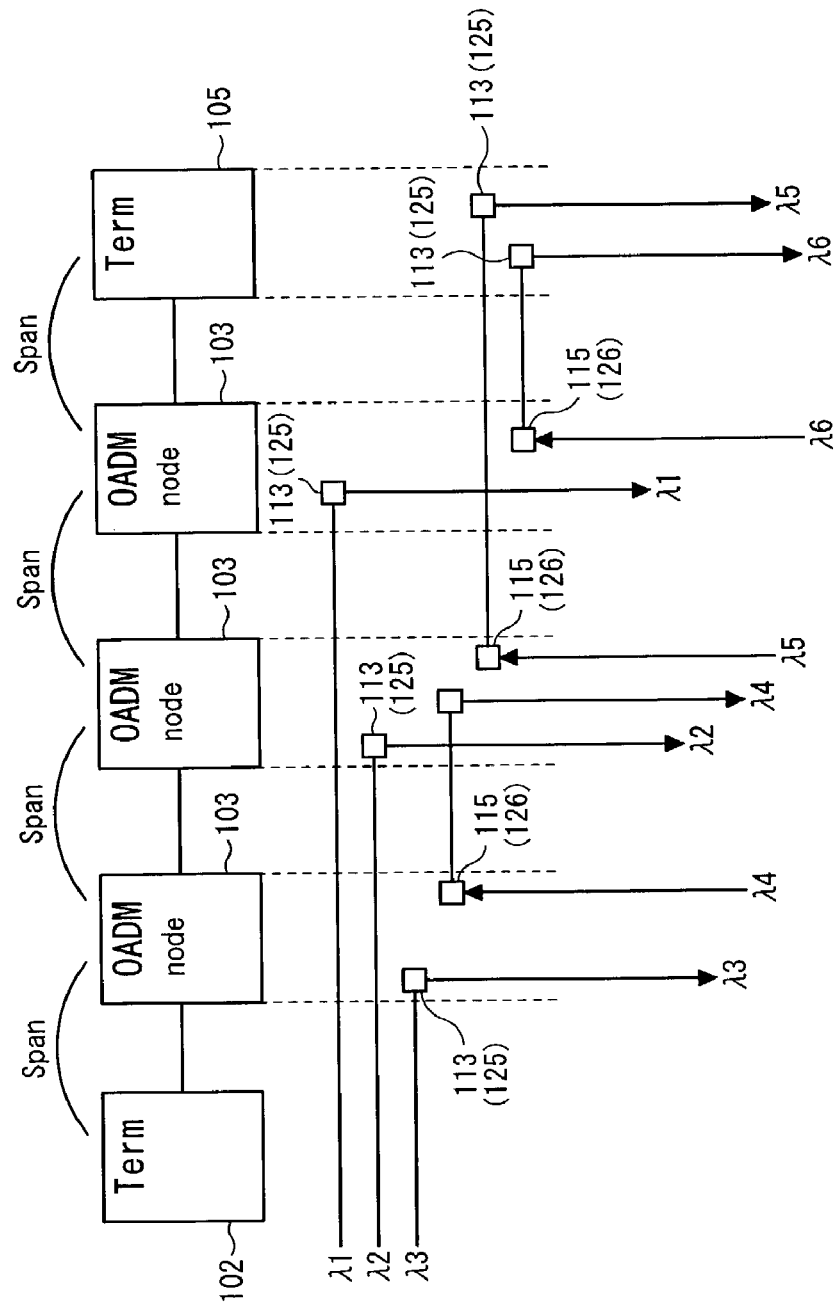
FIG. 21 is a diagram used to explain an example of the setting of a drop-add path in the WDM transmission system shown in FIG. 17.

In the OADM nodes 2-1 to 2-3 of the WDM transmission system, an optical signal of a wavelength which is dropped from a WDM signal is taken out by directional couplers 22 and tunable filters 25, as shown in FIGS. 1 and 2. The optical signal of the wavelength dropped is transmitted to the downstream side without being rejected by the optical switches 114 (see FIG. 19) and rejection filter 127 (see FIG. 20). In FIG. 2, reference numeral 7 denotes a transponder, which is provided in one of the NEs 6-1 to 6-3 shown in FIG. 1. Reference numeral 73a denotes a tunable laser diode for emitting light of an arbitrary wavelength to be added. The structure of a node 2 shown in FIG. 2 will be described in detail later.

In the above-described structure, if it is assumed that the first terminal 1 is a transmitting side (WDM transmitter) and the second terminal 3 a receiving side (WDM receiver), the optical signals of different wavelengths in a WDM signal transmitted from the first terminal 1 are all transmitted to the second terminal 3 independently of the dropping of wavelength at the OADM nodes (also referred to simply as nodes) 2. The same applies to the transmission from the second terminal 3 to the first terminal 1 in the opposite direction.

In this way, a WDM signal is transmitted between the terminals 1 and 3 independently of the dropping of wavelength. The monitoring of the OSNR of a WDM signal is performed only at the terminals 1 and 3. Therefore, a spectrum analyzer does not need to be provided for each OADM node 2, as is provided in prior art. That is, spectrum analyzers are equipped only in the terminals 1 and 3.

As a result, if monitor control information (which corresponds to the result of the monitoring obtained by the spectrum analyzer equipped in the terminals 1 and 3) is fed back to the OADM nodes 2 via an OSC, the OSNR can be corrected by performing preemphasis on the OADM nodes 2 from the receiving terminal 3 or 1.

For example, consider 6 (six) wavelengths $\lambda 1$ to $\lambda 6$ of a WDM signal, as shown in FIG. 1. Among optical signals of wavelengths $\lambda 1$ to $\lambda 6$, the optical signal of wavelength $\lambda 1$ is dropped at the OADM node 2-3. However, if the OSNR of the optical signal of wavelength $\lambda 1$ to be received by the receiving terminal 3 (or 1) is guaranteed, the OSNR at the OADM node 2-1 is also guaranteed. Therefore, the receiving terminal 3 (or 1) may control an upstream node so that the final OSNR of the optical signal of wavelength $\lambda 1$ satisfies a predetermined value. That is, based on the OSNR monitored at the terminal 3 (or 1), the transmission level of the WDM signal at the upstream terminal 1 (or 3) or OADM node 2, or at both may be controlled for each wavelength.

Note that the same is also true of other optical signals of different wavelengths. However, the number of spans that an optical signal passes through until it reaches the terminal 3 (or 1) varies depending on the wavelength. For instance, an optical signal of wavelength $\lambda 4$ which is added from the NE 6-1 at the node 2-1 passes through 3 spans. An optical signal of wavelength $\lambda 5$ which is added from the NE 6-2 at the node 2-2 passes through 2 spans. An optical signal of wavelength $\lambda 6$ which is added from the NE 6-3 at the node 2-3 passes through 1 span. If the number of spans becomes smaller, a smaller correction value for the OSNR becomes smaller. Therefore, a correction value for the OSNR at the terminal 3 (or 1) is determined and held in consideration of the number of spans that an optical signal of each wavelength passes through.

In such a system structure without rejection, transmission loss at each OADM node 2 can be reduced, because the optical switches 114 and the rejection filter 127 are unnecessary. Therefore, the number of optical components required of the OADM node 2, and capability to compensate for transmission loss (number of optical amplifiers, gain required of the optical amplifiers 21, 22, etc.), can be reduced. This makes a great contribution to a reduction in cost of the node 2 and the system itself.

In addition, since all wavelengths can be monitored by the terminal 3 (or 1) equipped with a spectrum analyzer, the state of transmission of the entire system can be collectively monitored. Thus, if the transmission state of the entire system is monitored by the receiving terminal 3 (or 1) of the final stage of the system, the number of wavelengths can be easily increased or decreased. For example, in FIG. 1, an optical signal of wavelength $\lambda 3$ to be dropped at the node 2-1 can be dropped at the node 2-2 of the next stage independently of the OSNR at the node 2-2, if there is no problem in the OSNR at the receiving terminal 3 (or 1).

In the above-described structure in which a WDM signal is transmitted between the terminals 1 and 3 independently of the dropping of an optical signal at the OADM node 2 (including the terminal 3 in the case of the structure shown in FIG. 1), an optical signal cannot be added at once. However, in the case where the NEs 4 and 5 connected to the terminals 1 and 3 are transmitters for a burst communication network such as an Ethernet, etc., an idle wavelength (channel) having no transmission data (user data), among the optical signals of different wavelengths to be transmitted between the terminals 1 and 3, occurs for a predetermined period. Such a wavelength and period are referred to as an idle wavelength (or an idle channel) and an idle period, respectively.

Therefore, even if an optical signal of an idle wavelength is stopped only for the above-described idle period or carries other transmission data only for the idle period, it has no influence on communication through other wavelengths. Hence, in the first embodiment, an optical signal is added from the NE 6 to the OADM node 2 by the following method (1) or (2).

(1) During the above-described idle period, the transmission of an optical signal of an idle wavelength from the terminals 1, 3 is stopped, and an optical signal with transmission data from the NE 6 is added to a WDM signal with an idle wavelength generated by such a transmission stop.

(2) During the above-described idle period, the NE 6 receives an optical signal of an idle wavelength, which is transmitted between the terminals 1 and 3, from the OADM node 2 and directly modulates the signal with self-transmission data. The obtained optical signal is returned to the OADM node 2 and added to a WDM signal.

WDM transmission system structures (first and second structures) for realizing the above-described methods (1) and (2) will hereinafter be described in detail. In the following description, the first structure for realizing the aforementioned method (1) is referred to as an idle-wavelength stopping structure. The second structure for realizing the aforementioned method (2) is referred to as a direct idle-wavelength modulating structure.

(A1) First Structure (Idle-Wavelength Stopping Structure)

Figure 3:
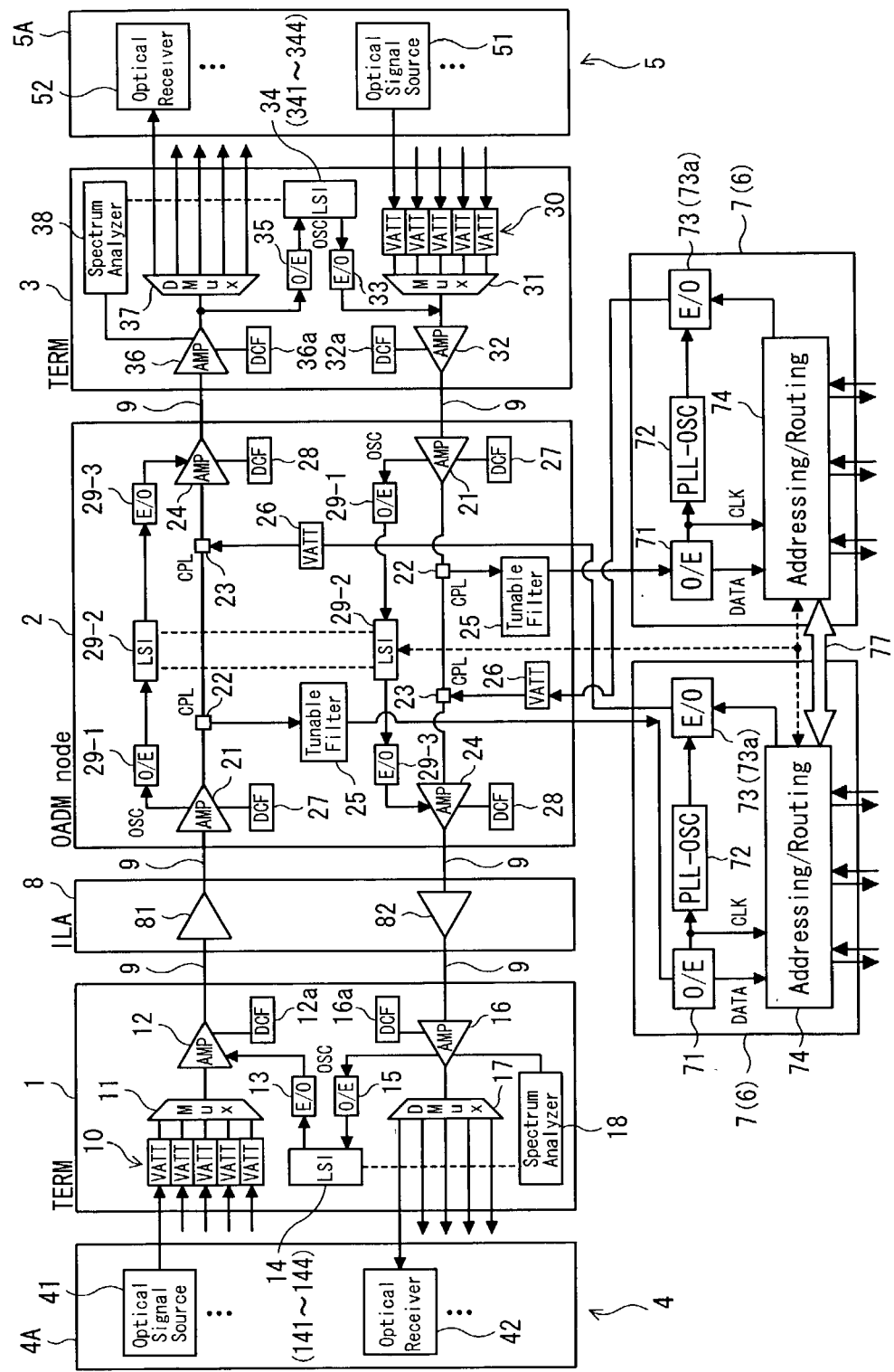
FIG. 3 is a block diagram showing a detailed structure (first structure) of the WDM transmission system shown in FIG. 1.

FIG. 3 shows a first structure of the WDM transmission system shown in FIG. 1. In the WDM transmission system shown in FIG. 3, a first NE 4 is provided with optical signal sources 41 and optical receivers 42 as a transponder 4A. The number of optical signal sources 41 corresponds to the number of multiplexed wavelengths of a WDM signal. The number of optical receivers 42 also corresponds to the number of multiplexed wavelengths. A second NE 5 has the same structure as the first NE 4 and is provided with optical signal sources 51 and optical receivers 52 as a transponder 5A. The transmitting system of a first terminal 1 includes variable optical attenuators (VATTs) 10 corresponding in number to the multiplexed wavelengths, a wavelength multiplexer 11, an optical amplifier 12, and a dispersion compensation fiber (DCF) 12a. The receiving system of the terminal 1 includes an optical amplifier 16, a DCF 16a, and a wavelength demultiplexer 17. The monitor control system of the terminal 1 includes an opto/electric (O/E) converter 13, an LSI 14, an electro/optical (E/O) converter 13, a spectrum analyzer 18, etc.

A second terminal 3 has the same structure as the above-described first terminal 1. The transmitting system of the second terminal 3 includes variable optical attenuators (VATTs) 30 corresponding in number to the multiplexed wavelengths, a wavelength multiplexer 31, an optical amplifier 32, and a dispersion compensation fiber (DCF) 32*a*. The receiving system of the second terminal 3 includes an optical amplifier 36, a DCF 36*a*, and a wavelength demultiplexer 37. The monitor control system of the second terminal 3 includes an opto/electric (O/E) converter 33, an LSI 34, an electro/optical (E/O) converter 35, a spectrum analyzer 38, etc. Note that in FIG. 3, only a single OADM node 2 is shown and other OADM nodes are omitted.

In the transponder 4A (or 5A) of the NE 4 (or 5), the optical signal source 4 (or 51) receives transmission data from a desired network (SDH/SONET, Ethernet, etc.), and transmits optical signals of different wavelengths to the terminal 1 (or 3) from the optical signal of a predetermined wavelength. The optical receiver 42 (or 52) receives the optical signal of a predetermined wavelength from the terminal 1 (or 3) and transmits the data carried by the optical signal to the above-described network.

In the case where the NE 4 (or 5) can be used in the burst communication network such as an Ethernet (R) of a gigabit level, etc., this embodiment is capable of fixedly transmitting an optical signal which has a predetermined pattern (e.g., a rectangular wave consisting of 1s and 0s), regardless of whether there is transmission data.

Figure 5:
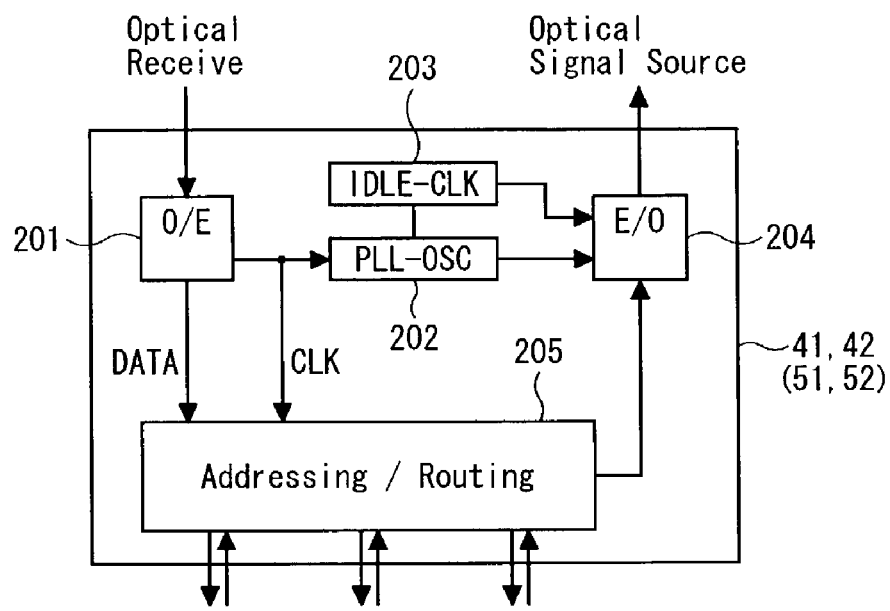
FIG. 5 is a block diagram showing a structure of the optical signal source of the terminal shown in FIG. 3.

That is, the optical signal source 4 (or 51) and optical receiver 42 (or 52) in this case are provided with an O/E converter 201, a phase-locked loop (PLL) oscillator 202, an idle-clock output section 203, an E/O converter 204, and an addressing/routing section 205, as shown in FIG. 5. During the time there is transmission data to be transmitted to the terminal 1 (or 3), an optical signal with a predetermined wavelength generated by the E/O converter 204 is modulated according to the output of the PLL oscillator 202 with the transmission data output from the addressing/routing section 205. In this way, an optical signal with the output (rectangular wave) of the PLL oscillator 202 is transmitted to the terminal 1 (or 3). During the time there is no transmission data, the output (rectangular wave (also referred to as an idle clock)) of the idle-clock output section 203 synchronized with the PLL oscillator 202 is supplied to the E/O converter 204 so that an optical signal with the rectangular wave is transmitted to the terminal 1 (3).

Note that the PLL oscillator 202 is operated to lock the phase of an idle clock (extracted at the E/O converter 201) included in an optical signal from the second terminal 3 (or 1). In this way, the NEs 4 and 5 can prevent out-of-synchronism when there is no transmission data.

The above-described "predetermined pattern" is also employed to prevent out-of-synchronism at the time of wavelength switching, that is, when the terminal 1 (or 3) stops the transmission of an optical signal of an idle wavelength and the NE 6 transmits an optical signal of the same wavelength as the idle wavelength. Furthermore, if an optical signal with the "predetermined pattern" is always transmitted, the WDM transmission system can be operated without having influence on the optical transmission characteristics, even if the transmission of a portion (optical signal of a certain wavelength) of the WDM signal is stopped.

Figure 6:
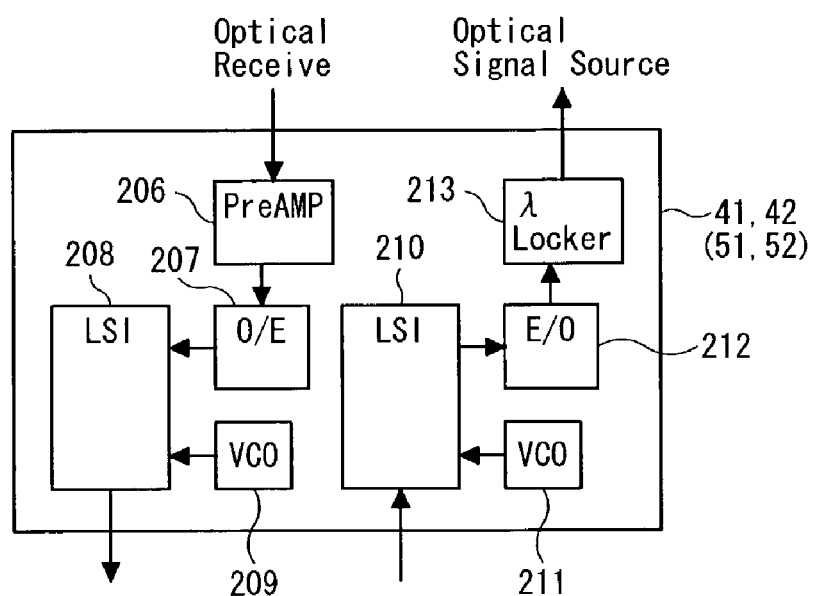
FIG. 6 is a block diagram showing another structure of the optical signal source of the terminal shown in FIG. 3.

On the other hand, in the case where the NE 4 (or 5) can be used in the SDH/SONET, the optical signal source 4 (or 51) and optical receiver 42 (or 52) are provided with a preamplifier 206, an O/E converter 207, an LSI 208, and a voltage controlled oscillator (VOC) 209, as the receiving system, as shown in FIG. 6. The transmitting system includes an LSI 210, a VCO 211, an E/O converter 212, and a wavelength locker 213.

In the above-described receiving system, an optical signal received from the terminal 1 (or 3) is amplified by the preamplifier 206 to compensate for transmission loss. Then, the optical signal is converted into an electrical signal by the O/E converter 207, and at the LSI 208, a predetermined reception process is performed on the SDH/SONET frame according to a reference operating clock supplied from the VCO 209. On the other hand, in the transmitting system, transmission data to be transmitted to the terminal 1 (or 3) undergoes a predetermined transmission process at the LSI 210 in accordance with a reference operating clock supplied from the VCO 211. Then, the data is converted into an optical signal of a predetermined wavelength by the E/O converter 212. At the wavelength locker 213, an unnecessary wavelength component is removed from the optical signal, which is in turn transmitted to the terminal 1 (or 3).

Note that the above-described optical signal source 4 (or 51) and optical receiver 42 (or 52) may be provided within the terminal 1 (or 3). In addition, the optical signal source 4 (or 51) and optical receiver 42 (or 52) for the burst communication network may be provided for all the wavelengths of the WDM signal, or they may be provided along with the optical signal source 4 (or 51) for the SDH/SONET. That is, a certain wavelength can be transmitted between the NEs 4 and 5 for the burst communication network, while another wavelength can be transmitted between the NEs 4 and 5 for the SDH/SONET.

Next, in the terminal 1 (or 3), the above-described variable attenuators 10 (or 30) are used to adjust the degree of attenuation of an optical signal received from the optical signal source 4 (or 51) to adjust the signal level of the optical signal. The respective degrees of attenuation are individually controlled by the LSI 14 (or 34). In this way, preemphasis control is performed on the WDM signal.

The multiplexer 1 (or 31) incorporates the optical signals with signals levels adjusted by the variable attenuators 10 (or 30), into a WDM signal. The optical amplifier 12 (or 32) collectively amplifies the optical signal level of the WDM signal to the level required for transmission to the opposed terminal 3 (or 1). The DCF 12*a* (or 32*a*) compensates for the dispersion of wavelength that occurs in the WDM signal.

Thus, the above-described variable attenuators 10, multiplexer 11, optical amplifier 12, and DCF 12*a* as a whole function as transmission means for transmitting a WDM signal to the opposed terminal 3 (or 1). In this case, they also function as a predetermined-pattern transmission section for transmitting the above-described predetermined pattern to the opposed terminal 3 (or 1) through an optical signal of a wavelength which becomes an idle wavelength of the WDM signal, regardless of whether there is transmission data from the NE 4 (or 5).

On the other hand, the optical amplifier 16 (36) amplifies the WDM signal, received through the optical transmission line 9, to the required level. The DCF 16*a* (36*a*) compensates for the dispersion of wavelength that occurs in the received WDM signal. The demultiplexer 17 (37) separates the WDM signal amplified by the optical amplifier 16 (or 36) into optical signals of different wavelengths. The optical signals of different wavelengths obtained at the multiplexer 17 (or 37) are respectively received by the optical receiver 42 (or 52).

The LSI 14 (or 34) collectively controls the operation of the terminal 3 (or 1), and the monitor control based on the OSC. For example, the LSI 14 (or 34) has the function of performing preemphasis control by adjusting the individual degrees of attenuation of the variable attenuators 10 (or 30), based on the monitor control information extracted by performing photoelectric conversion on the WDM signal transmitted through the OSC by the O/E converter 15. The LSI 14 (or 34) also has the function of converting the monitor control information into an optical signal for the OSC at the E/O converter 13 and adding the optical signal to a WDM signal.

In addition to the above-described functions, the LSI 14 (or 34) has the following functions:

(1) Function of informing the downstream OADM node 2 (also referred to as the downstream node 2) of an idle wavelength through the OSC [idle notification section 141 (or 341)];

(2) Function of stepwise controlling the degree of attenuation of the variable attenuator 10 to stepwise lower the optical signal level of the idle wavelength and finally stop the transmission, when a response (busy signal) to the above-described notification is received through the OSC [transmission control means (transmission level control section) 142 (or 342)];

(3) Function of issuing transmission allowance to the downstream node 2 that sent the above-described busy signal (when the busy signals about the same idle wavelength are received from a plurality of nodes 2, one of the nodes 2) [transmission-allowance issuing means (mediation control section) 143 (or 343)]; and (4) Function of opening the variable attenuator 10 in response to the transmission completion notification from the downstream node 2 and restarting the transmission of the optical signal of the idle wavelength that was stopped [restart control section 144 (or 344)].

As shown in FIG. 3 and partially mentioned in FIGS. 1 and 2, the OADM node 2 has a symmetrical structure consisting of a transmission system and a receiving system for two-way communication. Therefore, the OADM node 2 is provided with optical amplifiers 21, 24 and DCFs 27, 28. The OADM node 2 is also provided with an O/E converter 29-1, an LSI 29-2, and an E/O converter 29-3, which constitute the monitor control system based on the OSC. The OADM node 2 is further provided with an optical coupler 22 and a tunable filter 25, which constitute the optical-signal separating section. The OADM node 2 is further provided with an optical coupler 23 and a variable attenuator (VATT) 26, which constitute the optical-signal adding section.

The optical amplifier 21 collectively amplifies the optical signal level of the WDM signal, received through the optical transmission line 9, to the required level to compensate for a demultiplexing loss that will occur at the coupler 22 of the following stage. The DCF 27 is connected to the optical amplifier 21 and compensates for the dispersion of wavelength that occurs in the WDM signal.

The first optical coupler (optical separating-passing section) 22 transmits the WDM signal amplified by the optical amplifier 21 to the tunable filter 25 and also to the optical coupler 23 of the subsequent stage. The tunable filter (variable wavelength selecting section) 25 is a filter for selecting a variable wavelength. For example, according to the setting of a selected wavelength from the LSI 29-2, the tunable filter 25 selects only an optical signal of an arbitrary wavelength of the WDM signal transmitted from the optical coupler 22, and drops the selected optical signal to the NE 6 (transponder 7).

The variable attenuator 26 previously adjusts the level of an optical signal transmitted from the NE 6 (transponder 7), to a suitable level for the addition of the optical signal to the WDM signal. For example, if the degree of attenuation is suitably adjusted by the LSI 29-2, such a level adjustment is made.

The second optical coupler (optical-signal adding section) 23 adds the optical signal, transmitted from the NE 6 and adjusted by the variable attenuator 26, to a vacant wavelength of the WDM signal transmitted from the upstream coupler 22. That is, instead of an optical signal of an idle wavelength being stopped, the optical signal from the NE 6 is added to an idle wavelength of the WDM signal. The vacant wavelength is generated when the upstream terminal 1 (or 3) stops transmission.

The optical amplifier 24 collectively amplifies the WDM signal, transmitted from the optical coupler 23, to compensate for a transmission loss that occurs when the optical signal from the NE 6 is added to a vacant wavelength of the WDM signal at the coupler 23. The DCF 28 is connected to the optical amplifier 24 and compensates for the dispersion of wavelength that occurs in the WDM signal. Note that each of the above-described optical amplifiers 12, 16, 21, 24, 32, and 36 is constructed of an erbium-doped fiber amplifier (EDFA).

Figure 4:
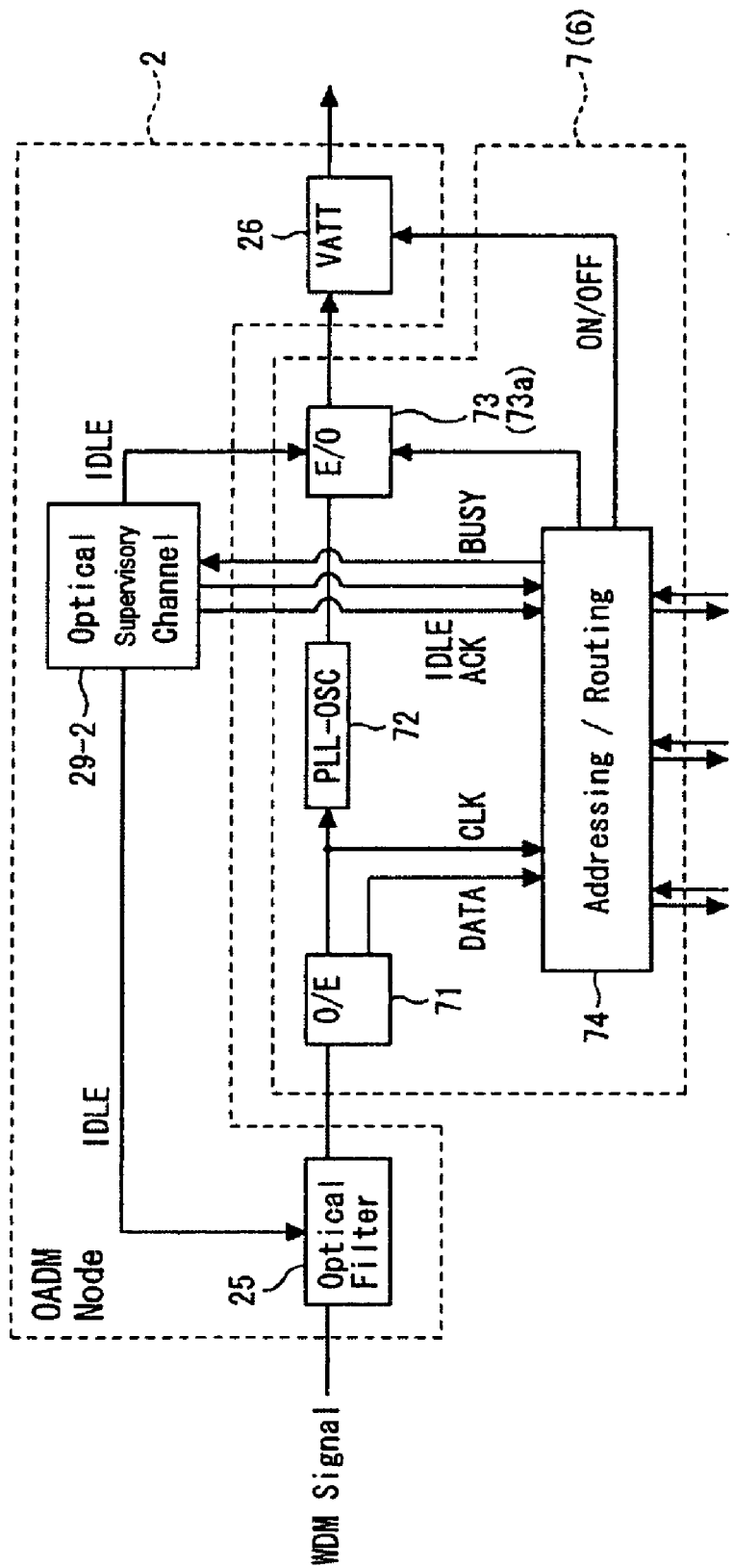
FIG. 4 is a block diagram showing the OADM and NE shown in FIG. 3.

In the NE 6, as shown in FIGS. 3 and 4, the transponder 7 includes an O/E converter 71, a PLL oscillator 72, an E/O converter 73, an addressing/routing section 74, etc.

The O/E converter 71 and the PLL oscillator 72 constitute separated-light reception means for receiving an optical signal of an idle wavelength from the OADM node 2. More specifically, the O/E converter 71 receives an optical signal dropped by the coupler 22 and tunable filter 25 of the OADM node 2, and then converts the received signal into an electrical signal. In this embodiment, the data included in the received optical signal by the photoelectric conversion is extracted, and a predetermined pattern that the terminal 1 (or 3) transmitted regardless of whether there is self-transmission data is also extracted.

The PLL oscillator (predetermined-pattern holding section) 72 holds the above-described predetermined pattern as a reference transmission clock by oscillating in synchronization with the phase of the predetermined pattern obtained by the O/E converter 71, and supplies the predetermined pattern to the E/O converter 73 as a transmission clock for an optical signal which is employed in the self-NE 6 (transponder 7). That is, in the NE 6 of this embodiment, light with the predetermined pattern is regarded as carrier light. A reference transmission clock is detected from this carrier light at the O/E converter 71 and held by the PLL oscillator 72.

The E/O converter 73 and the addressing/routing section 74 constitute addition-light transmitting means for adding another transmission data, which is transmitted by the self-NE 6, to an optical signal of the same wavelength as a vacant wavelength obtained when the terminal 1 (or 3) stops the transmission of an optical signal of an idle wavelength, and for transmitting the optical signal with the transmission data to the OADM node 2. More specifically, the E/O converter 73 has a tunable laser diode 73a, which generates an optical signal of the same wavelength (addition wavelength) as the above-described idle wavelength. In synchronization with the transmission clock supplied from the PLL oscillator 72, the transmission data to be transmitted by the self-NE 6 is added to the generated optical signal (an optical signal of an addition wavelength is modulated with the transmission data) and is transmitted to the OADM node 2 (variable optical attenuator 26).

That is, the E/O converter 73 functions as an addition-wavelength signal generating section for generating an optical signal of an addition wavelength which is transmitted to the OADM node 2. The E/O converter 73 also functions as a light modulation section for modulating the generated optical signal with transmission data which is transmitted by the self-NE 6, in synchronization with the predetermined pattern held by the PLL oscillator (predetermined-pattern holding section) 72, and for transmitting the modulated signal to the OADM node 2.

The addressing/routing section 74 addresses and routes data which is transmitted and received between it and the burst communication network (not shown), and also outputs transmission data to the E/O converter 73. In this case, when the addressing/routing section 74 is informed of an idle wavelength by the terminal 1 (or 3) through the LSI (OSC) 29-2, as shown in FIG. 4, the addressing/routing section 74 transmits a transmission allowance request (busy signal) to the terminal 1 (or 3) via the LSI (OSC) 29-2, if there is transmission data to be transmitted (added) to the OADM node 2. If a response (transmission allowance acknowledgment (ACK)) to the busy signal is received by the OSC, the addressing/routing section 74 requests the LSI 29-2 to stepwise open the variable attenuator 26, and outputs transmission data, which is employed to modulate an optical signal of a wavelength which is added at the E/O converter 73, to the E/O converter 73.

However, the addressing/routing section 74 does not transmit the above-described transmission data to the E/O converter 73 for a predetermined time, after it receives the transmission allowance acknowledgment (ACK) from the terminal 1 (or 3) through the OSC. Therefore, during the predetermined time before transmission data is actually transmitted to the OADM node 2, the E/O converter 73 transmits only the predetermined pattern held by the PLL oscillator 72 to the OADM node 2 so that the output level of an optical signal of an addition wavelength rises stepwise.

That is, the addressing/routing section 74 functions as a transmission-level control section for raising the transmission level of an optical signal of an addition wavelength having the above-described predetermined pattern which is transmitted to the OADM node 2, for the above-described predetermined time. The E/O converter 73 functions as a predetermined-pattern transmitting section for transmitting the predetermined pattern held by the PLL oscillator 72 to the OADM node 2 through an optical signal of an addition wavelength for the predetermined time, before transmission data is transmitted.

Thus, in the terminal 1 (or 3) of this embodiment, light with the predetermined pattern, which is transmitted regardless of whether there is transmission data, is regarded as carrier light. The NE 6 detects a reference transmission clock from the carrier light at the O/E converter 71 and holds the reference transmission clock by the PLL oscillator 72. In this way, the entire WDM transmission system is operated in synchronization with the above-described predetermined pattern.

In the above-described synchronous state, if the NE 6 receives transmission allowance from the terminal 1 (or 3), the predetermined pattern being held is transmitted to the OADM node 2 for a fixed time, while stepwise raising the transmission level. Thereafter, transmission data to be actually transmitted by the NE 6 is transmitted. Therefore, even if the transmission of an optical signal of an idle wavelength is stopped due to the switching of an idle wavelength and an addition wavelength, the time required for the reextraction of a reference transmission clock (establishment of resynchronization) at a communication destination can be reduced.

That is, the timing at which an optical signal of an addition wavelength is transmitted from the NE 6 to the OADM node 2 is ideally when the transmission of an optical signal of an idle wavelength from the upstream side is stopped. However, out-of-phase (out-of-synchronism) always occurs in a high-speed signal. Because of this, the predetermined pattern before the stop of transmission of an optical signal of an idle wavelength is held as a reference transmission clock, as described above. Before data is actually transmitted (or added) from the NE 6, the predetermined pattern being held is transmitted for a predetermined time. This facilitates the reextraction of a reference transmission clock at a communication destination that results from out-of-synchronism due to a switch to an addition wavelength.

Figure 8:
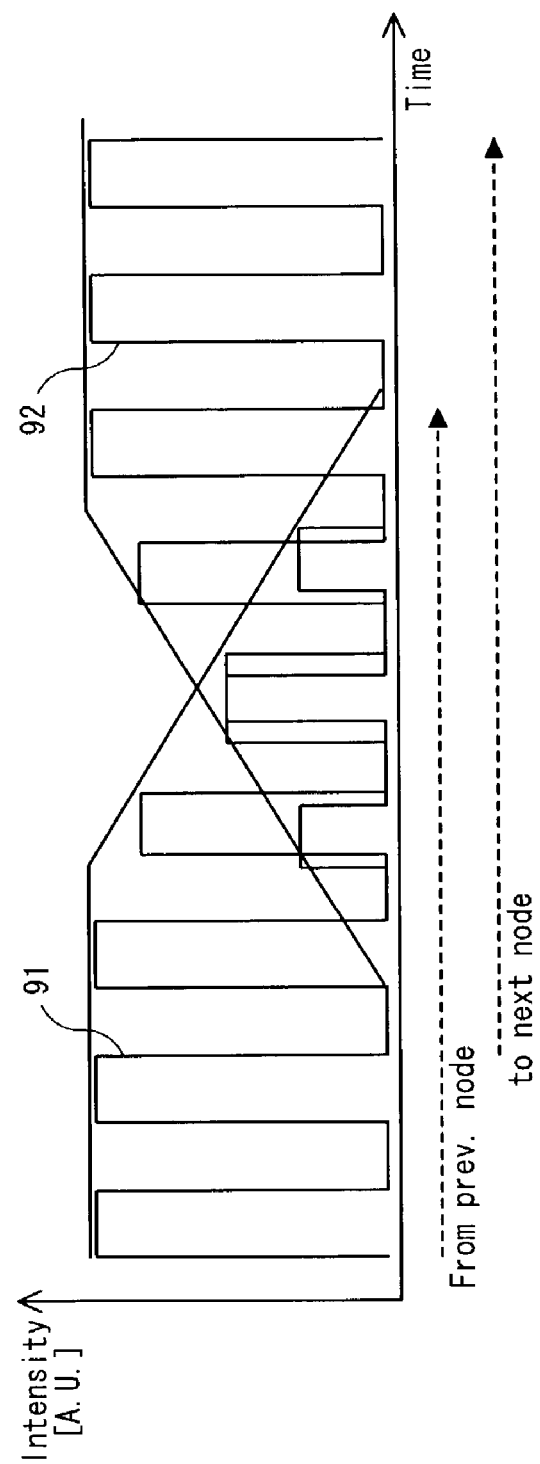
FIG. 8 is a diagram used to explain the stepwise light level control in the WDM transmission system shown in FIGS. 1 and 3.

When transmitting the predetermined pattern for a predetermined time, the transmission level is raised stepwise, as described above. Therefore, as schematically shown in FIG. 8, a predetermined pattern 91 transmitted by the most upstream terminal 1 (or 3) and a predetermined pattern 91 transmitted by the NE 6 are mixed together at the optical coupler 23 of the OADM node 2, and it becomes possible to stepwise (gradually) shift the phase of the synthesized waveform.

As a result, the instantaneous phase shift of a reference transmission clock at the time of the switching of an optical signal of an idle wavelength and an optical signal of an addition wavelength can be prevented and it becomes possible to prevent the out-of-synchronism of an optical signal of an addition wavelength. It becomes possible to quickly provide an adding-dropping structure for an arbitrary wavelength. In addition, the above-described predetermined time (during which a predetermined pattern is transmitted before transmission data is actually transmitted) can be prevented from becoming inadvertently long.

Note that the above-described stepwise control for the transmission level of an optical signal is also performed in the case where the NE 6 completes data transmission and the terminal 1 (3) restarts transmission of an optical signal of an idle wavelength being stopped. That is, in this case, during a predetermined time between the completion of the data transmission by the NE 6 and the restart of the transmission of an optical signal of an idle wavelength by the terminal 1 (or 3), the transmission level of the predetermined pattern 92 transmitted by the NE 6 is lowered stepwise. On the other hand, the transmission level of the predetermined pattern 91 transmitted by the terminal 1 (3) is raised stepwise.

The addressing/routing sections 74 of the NEs 6 (transponders 7) are connected through a communication line 77 so that they can communicate with each other. Between different NEs 6 and 6 (transponders 7), an added or dropped signal can be transmitted and received. With this structure, data received from the burst communication network by an NE 6 can be added to a WDM signal through a different NE 6. In addition, a dropped signal received from the OADM node 2 by an NE 6 can be added to a WDM signal that is transmitted in the opposite direction between the terminals 1 and 3.

In FIG. 3, an optical repeater (ILA) 8 is interposed between the terminal 1 and the OADM node 2. The optical repeater 8 is equipped with optical amplifiers 81, 82 that compensate for a transmission loss which corresponds to a relayed distance of a WDM signal, for two-way communication, as with the terminal 1 (or 3) and OADM nodes 2. A suitable number of optical repeaters 8 are provided according to a transmission distance of a WDM signal. The optical repeater 8 may be provided between the OADM node 2 and the terminal 3, or within the OADM node 2. In addition, in the optical repeater 8 of this embodiment, the gain control disclosed in Japanese Laid-Open Patent Publication No. HEI 11-261490 can be employed.

Operation of the first structure of the WDM transmission system will hereinafter be described in detail with reference to a sequence diagram (steps S1 to S10) shown in FIG. 7.

Initially, between the terminals 1 and 3, the above-described predetermined pattern is being transmitted by an optical signal of a wavelength that may become an idle wavelength of a WDM signal, regardless of whether there is transmission data. In such a state, an optical signal of wavelength $\lambda 3$ transmitted from the terminal 1 in FIG. 1, for example, is dropped at the OADM node 2-1. However, when the optical signal of wavelength $\lambda 3$ has no data, the terminal 1 transmits an idle notification about the idle wavelength $\lambda 3$ to the OADM nodes 2 and terminal 3 of the downstream through the OSC (step S1).

For instance, in the case where the NE 6-1 in FIG. 1 needs to transmit data at the wavelength $\lambda 3$, the NE 6-1 connected to the OADM node 2-1 transmits a busy signal to the terminal 1 through the OSC (step S2). If the terminal 1 receives the busy signal, the terminal 1 transmits a response (ACK) to the NE 6-1 as transmission allowance acknowledgement through the OSC (step S3). Next, the transmission of an optical signal of wavelength $\lambda 3$ is stopped by stepwise closing the variable attenuator 10 which corresponds to the optical signal of wavelength $\lambda 3$. Therefore, during the time the optical signal of wavelength $\lambda 3$ is not transmitted, the communication between other nodes can be performed.

If the terminal 1 stops the transmission of the optical signal of wavelength $\lambda 3$, as described above, the terminal 1 transmits a transmission-stop completion notification to the NE 6-1 that transmitted the busy signal, through the OSC (step S4). In response to the transmission-stop completion notification, the NE 6-1 stepwise opens the variable attenuator 26 so that the predetermined pattern (reference transmission clock) being held by the PLL oscillator 72 is output from the E/O converter 73 for a predetermined time through the optical signal of wavelength $\lambda 3$ (step S5).

Therefore, as described above in FIG. 8, the output level of the predetermined pattern 91 transmitted by the terminal 1 is lowered stepwise, and the output level of the predetermined pattern 92 transmitted by the NE 6-1 is raised stepwise. In such a state, the predetermined patterns 91 and 92 are mixed together at the optical coupler 23 of the OADM node 2-1.

After the predetermined time, the NE 6-1 outputs transmission data from the addressing/routing section 74 to the E/O converter 73. At the E/O converter 73, the optical signal of wavelength $\lambda 3$ with the predetermined pattern 92 is modulated with the transmission data and transmitted to the OADM node 2-1 (step S6).

Therefore, at the OADM node 2-1, the optical signal of wavelength $\lambda 3$ transmitted by the NE 6-1, instead of the optical signal of idle wavelength $\lambda 3$ transmitted by the terminal 1, is added to the WDM signal being transmitted between the terminals 1 and 3. After the completion of transmission of the transmission data, the NE 6-1 transmits a transmission completion notification to the terminal 1 through the OSC (step S7). At this time, the downstream side is informed by the NE 6-1 that the wavelength $\lambda 3$ is in an idle state (step S8).

Thereafter, the NE 6-1 stepwise lowers the transmission level of the optical signal of wavelength $\lambda 3$ (predetermined pattern 92) and finally stops the transmission, and outputs that effect to the downstream side (step S9). In response to the transmission completion notification, the terminal 1 outputs the optical signal of wavelength $\lambda 3$ being stopped, while gradually raising the transmission level (step S10). Therefore, even at the time of the restart of transmission of the optical signal of idle wavelength $\lambda 3$ from the terminal 1, out-of-synchronism due to a sharp phase shift can be prevented and the optical signal of wavelength $\lambda 3$ can be switched.

Thus, according to the WDM transmission system of this embodiment, a WDM signal is transmitted between the terminals 1 and 3 regardless of the dropping of wavelength. And if an idle wavelength having no transmission data occurs, the transmission of the optical signal of the idle wavelength is stopped by the most upstream terminal 1 (or 3) to generate a vacant wavelength. Since the idle wavelength is utilized to transmit another transmission data (between other NEs 6), an increase or decrease in the number of wavelengths and transmission line switching (change in the adding-dropping structure) can be flexibly realized in accordance with an increase or decrease in traffic between nodes. Therefore, according to traffic, limited wavelength resources can be effectively utilized to the maximum, and WDM transmission performance per 1 channel is greatly enhanced.

In addition, the OADM nodes 2 between the terminals 1 and 3 are constructed so that an optical signal of a wavelength to be dropped is transmitted without being rejected. Therefore, the OSNR of a WDM signal may be collectively monitored at the terminals 1 and 3. A spectrum analyzer does not need to be provided for each OADM node 2, as is provided in prior art. That is, spectrum analyzers may be equipped only in the terminals 1 and 3.

Therefore, there is no need to monitor the OSNR of a WDM signal by spectrum analyzers provided in the OADM nodes 2 and control each OADM node 2 according to the result of the monitoring. For example, there is no need to perform preemphasis control according to a difference in the number of spans that each wavelength passes through. As a result, the size and cost of the OADM nodes 2 can be substantially reduced. In addition, the setting of a target path group for the adding-dropping becomes easy.

Furthermore, the transmission of the monitor control information (i.e., information about the number of wavelengths) between nodes, including preemphasis control, does not need to be performed for each node, as it does in prior art. Therefore, even if the size of the system is increased, the transmission capacity of the OSC does not need to be increased and wavelength resources can be effectively utilized. In addition, even after the start of services, the wavelength adding-dropping structure can also be changed (upgraded) without stopping the services.

Figure 9:
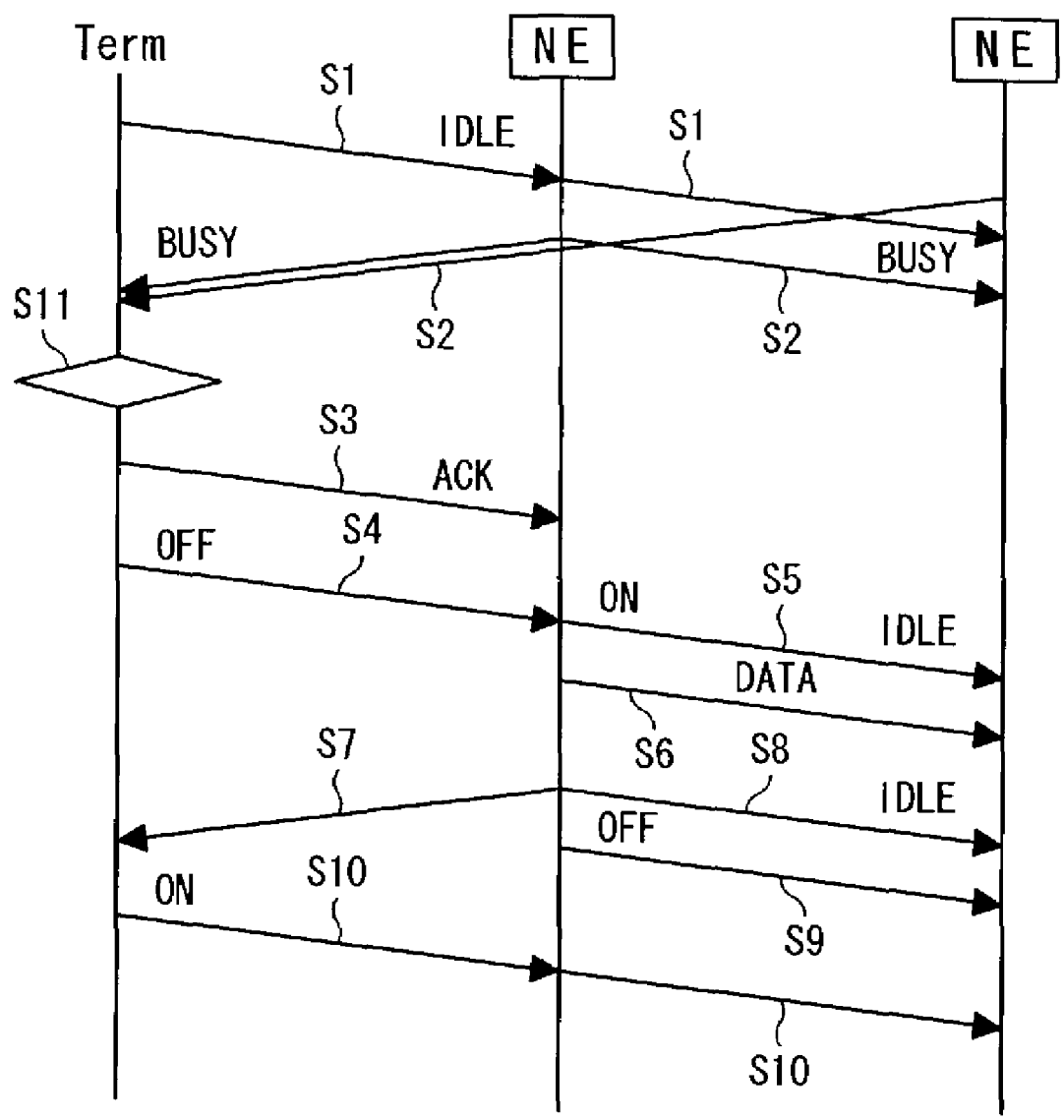
FIG. 9 is a diagram used to explain operation (mediation control) of the WDM transmission system shown in FIGS. 1 and 3.

In the case where busy signals are received from a plurality of nodes 2 when the terminal 1 (or 3) informs the downstream node 2 about an idle wavelength, the terminal 1 (or 3) judges and selects a node 2 to which a transmission allowance acknowledgement (ACK) is transmitted, as shown in FIG. 9 (step S11). The terminal 1 (or 3) transmits a transmission allowance acknowledgement (ACK) only to the selected node 2 through the OSC.

Figure 7:
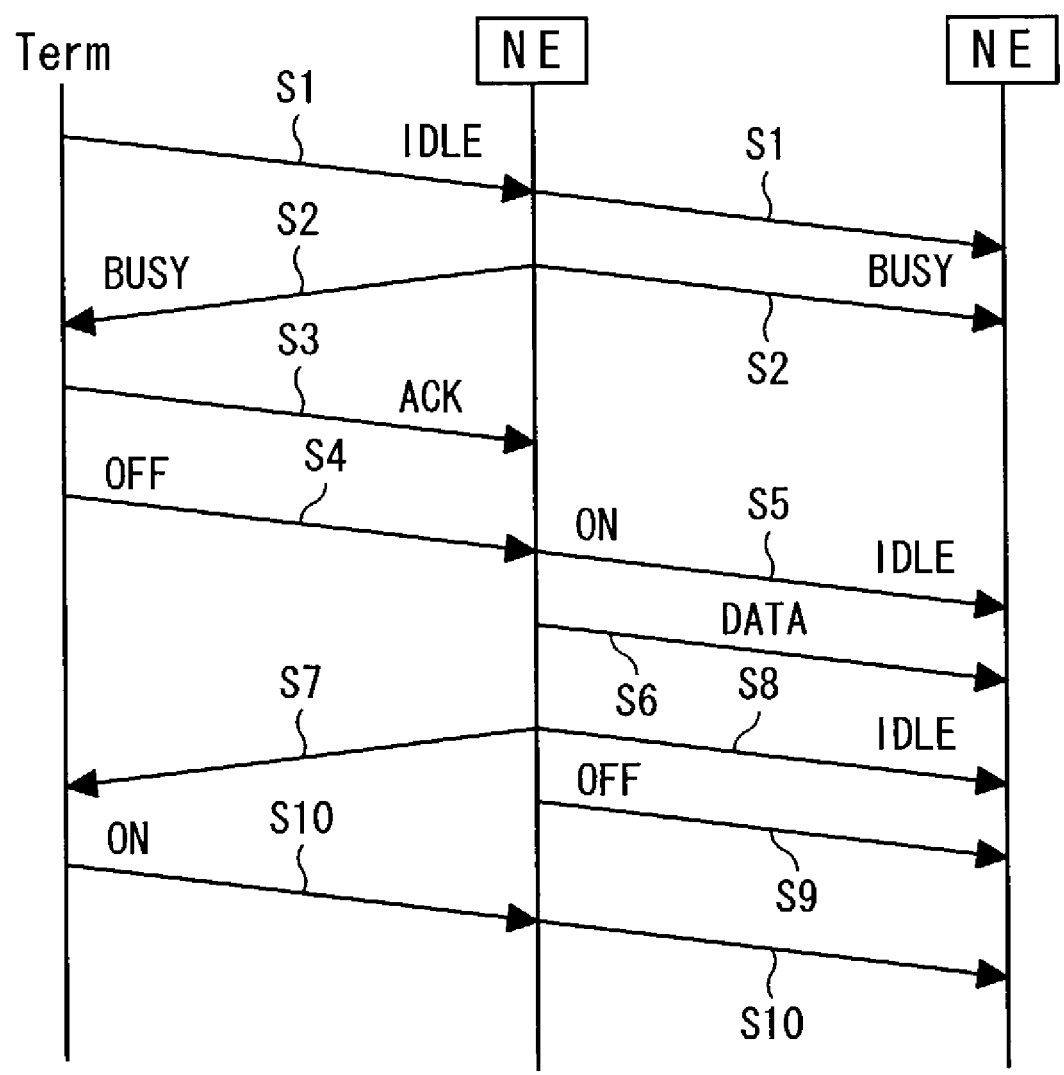
FIG. 7 is a diagram used to explain operation of the WDM transmission system shown in FIGS. 1 and 3.

The remaining sequence is the same as the sequence described in FIG. 7. The judgement of a node to which a transmission allowance acknowledgment is transmitted may be performed according to the order of priority set to the nodes 2. This can avoid the situation that the NE 6 cannot perform communication for a long time due to a conflict of busy signals. As a result, the reliability of the WDM transmission system is considerably enhanced.

In addition, from the viewpoint of WDM transmission system characteristics it is necessary to avoid the state in which optical signals of all wavelengths are not transmitted in a certain span and therefore there are no inputs to the optical amplifiers 12, 21, 24, and 36. Hence, when the terminal 1 (or 3) receives busy signals for all wavelengths, the terminal 1 gives transmission allowance to avoid the state in which optical signals of all wavelengths are not transmitted.

Figure 10:
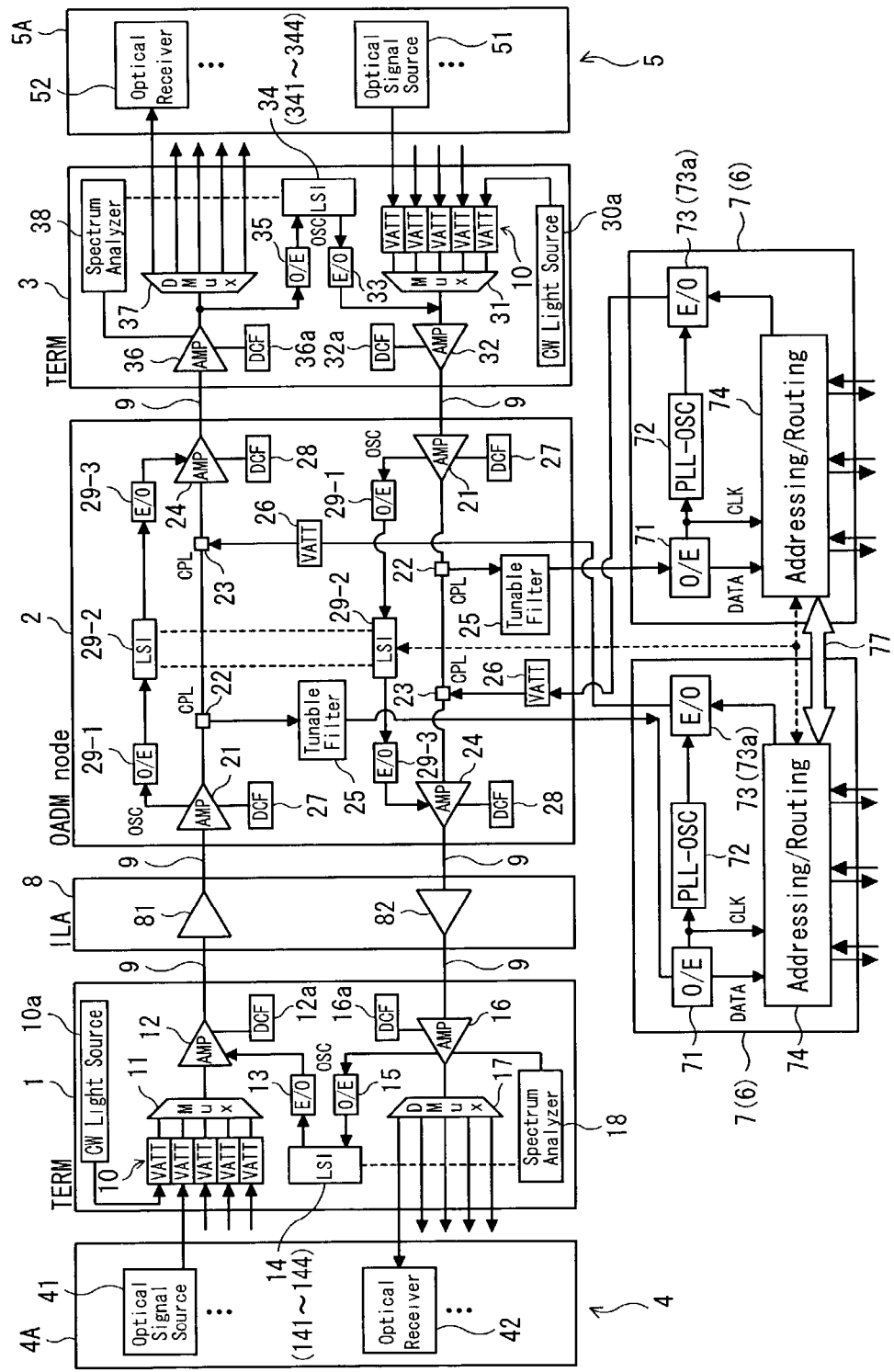
FIG. 10 is a block diagram showing a modification of the WDM transmission system shown in FIG. 3.

Alternatively, as shown in FIG. 10, the terminal 1 (or 3) may be provided with a continuous wave (CW) light source 10a (or 30a). If at least one wavelength is allocated to the output of CW light, the CW light is continuously output, even when the terminal 1 (or 3) receives busy signals for all other wavelengths. Therefore, the reliability of the WDM transmission system is considerably enhanced.

(A2) Second Structure (Direct Idle-Wavelength Modulating Structure)

Figure 11:
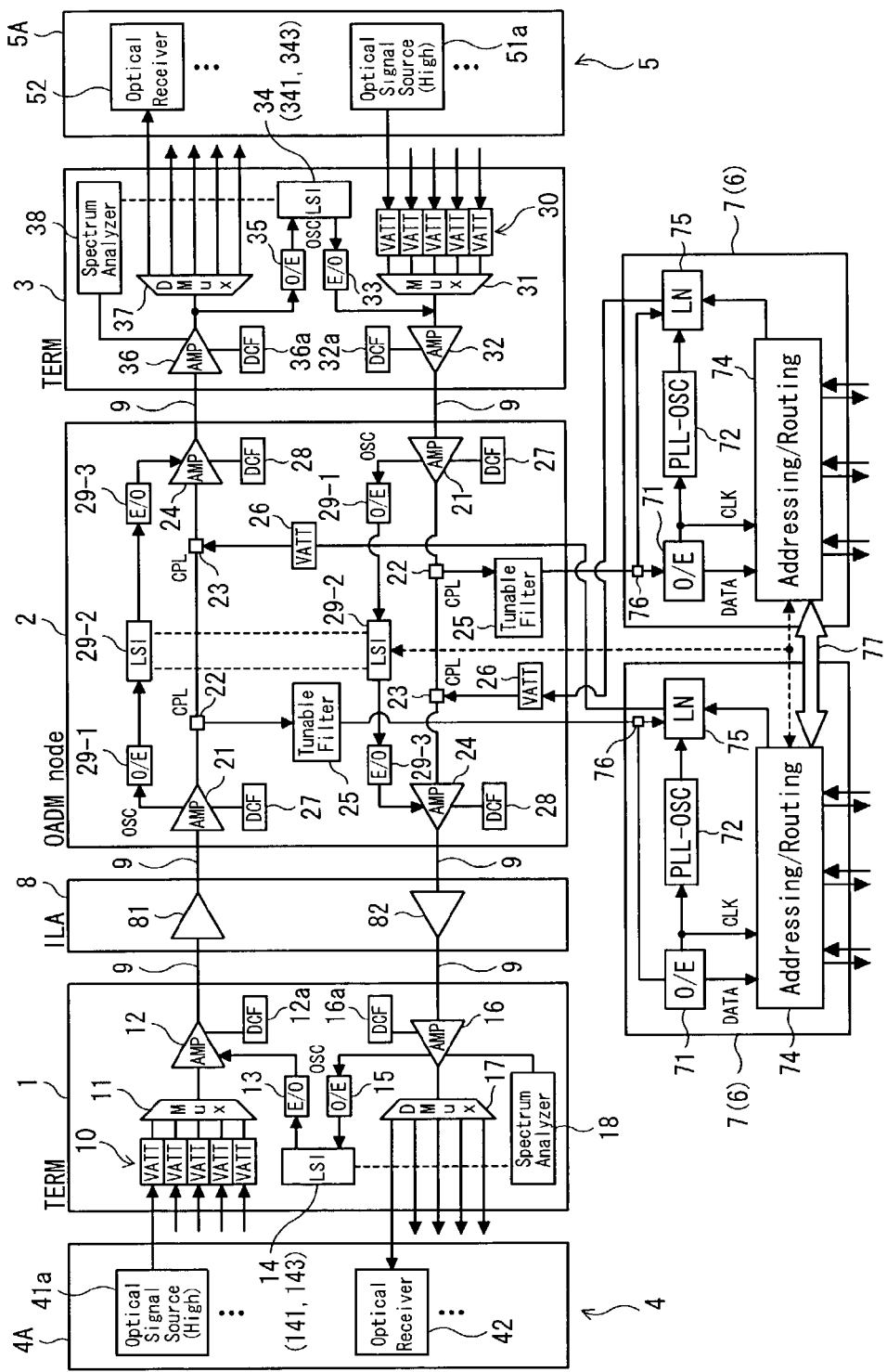
FIG. 11 is a block diagram showing a detailed structure (second structure) of the WDM transmission system shown in FIG. 1.
Figure 12:
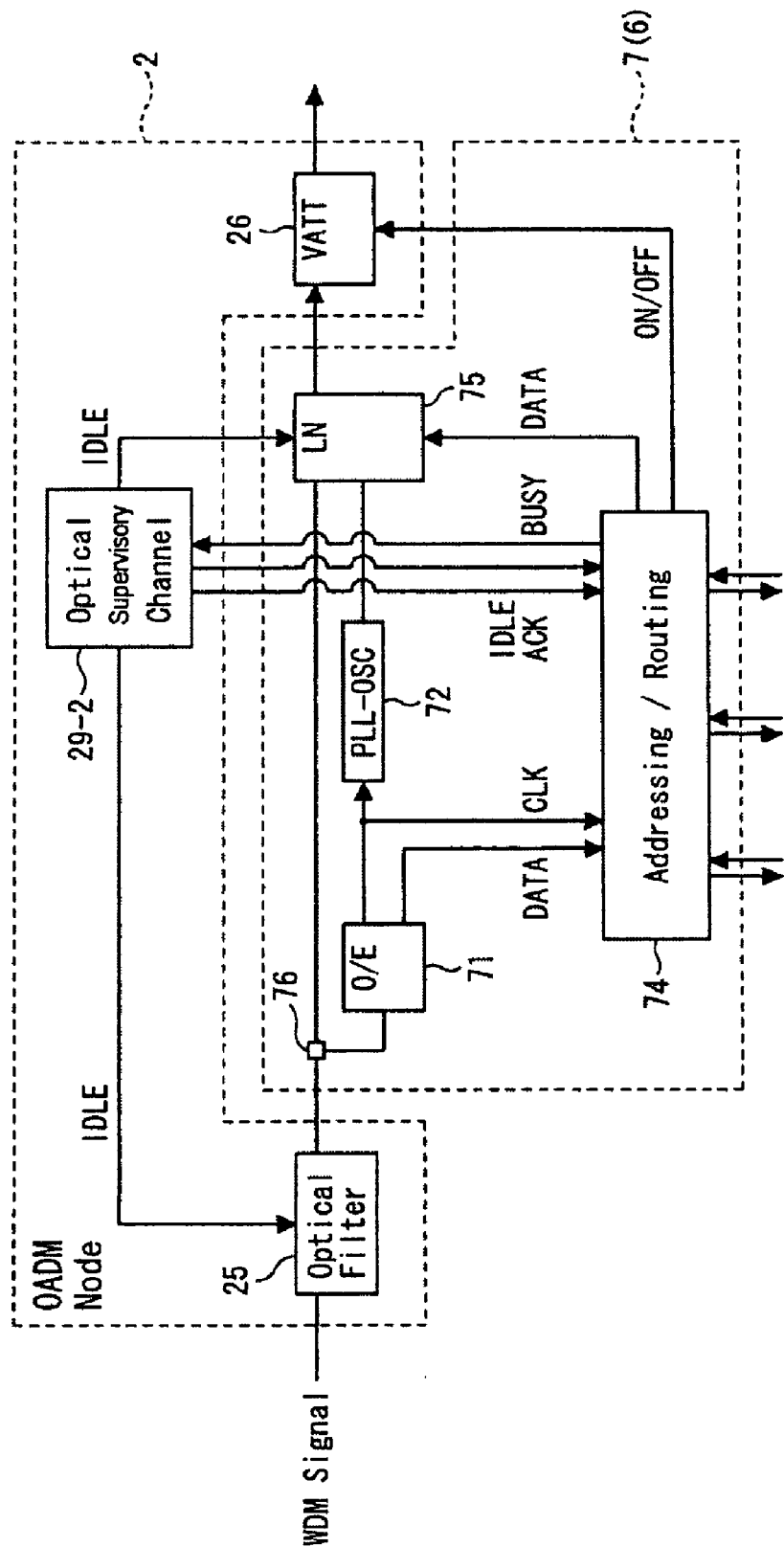
FIG. 12 is a block diagram showing the OADM node and NE shown in FIG. 11.

FIG. 11 shows a second structure of the WDM transmission system shown in FIG. 1. The WDM transmission system of FIG. 11 differs from the system of FIG. 3 in that the transponder 4A (or 5A) of the NE 4 (or 5) is provided with an optical signal source 41a (or 51a) instead of the optical signal source 4 (or 51). In addition, as shown in FIG. 12, the transponder 7 of the NE 6 is provided with a lithium niobate (LN) modulator 75 instead of the E/O converter 73. The transponder 7 of the NE 6 is further provided with an optical coupler 76. Note that the same reference numerals denote the same parts as those described in the first structure of the WDM transmission system.

Figure 13:
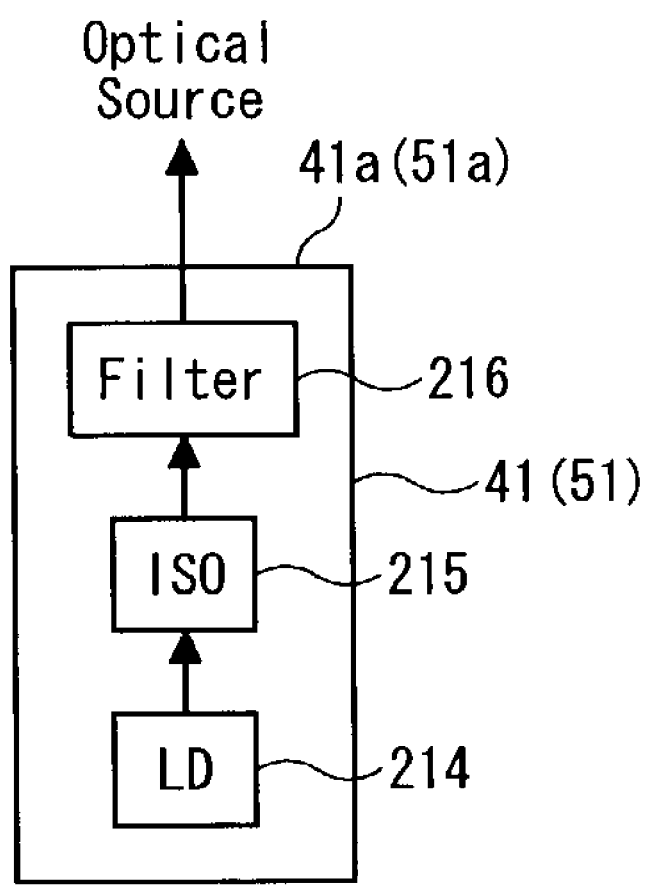
FIG. 13 is a block diagram showing the optical source of the terminal shown in FIG. 11.

The optical signal source 41a (or 51a) has a laser diode (LD) 214 of a predetermined wavelength, as shown in FIG. 13. The laser diode 214 outputs light with a predetermined pattern (all 1s) when the NE 4 (5) has no data to be transmitted. In FIG. 13, reference numeral 215 denotes an optical isolator that prevents reflected light from being fed back to the LD 214. Reference numeral 216 denotes an optical filter which removes light of unnecessary wavelengths.

In this case, the most upstream terminal 1 (3) always transmits DC light to the terminal 3 (1) without controlling the DC light source 214 with the variable attenuator 10 (transmission stop control), regardless of whether there is a busy signal. Therefore, in the second structure of the WDM transmission system, the LSI 14 of the terminal 1 (or 3) does not need to have the function of stepwise stopping the transmission of an idle wavelength [transmission control means (transmission level control section) 142 (or 342)] and the function of restarting the transmission of an optical signal of an idle wavelength being stopped [transmission restart control section 144 (or 344)], described in the first structure. As a result, in the NE 6 (transponder 7), stepwise transmission level control for a predetermined pattern is unnecessary.

In the NE 6, the optical coupler 76 outputs an optical signal dropped by the optical coupler 22 and tunable filter 25, to the O/E converter 71 and the LN modulator 75. The LN modulator (direct optical modulator) 75 modulates the optical signal of an idle wavelength input from the optical coupler 76, with self-transmission data sent from the addressing/routing section 74. The modulated optical signal is transmitted from the LN modulator 75 to the variable attenuator 26 of the OADM node 2.

That is, in the second structure of the WEM transmission system, the DC light, which is transmitted between the terminals 1 and 3 regardless of the dropping of wavelength at the intermediate OADM node 2, is received by the NE 6 connected to the OADM node 2. The DC light is directly modulated by the LN modulator 75 with transmission data that is transmitted by the NE 6. In this way, the above-described optical signal with the transmission data of the NE 6 is transmitted to the variable attenuator 26 of the OADM node 2.

Therefore, when there is data to be transmitted, the NE 6 (transponder 7) transmits a busy signal to the upstream and downstream sides. Thereafter, the DC light of an idle wavelength received from the upstream side may be modulated by the NE modulator 75 with transmission data that is transmitted by the NE 6. Therefore, one NE 6 can communicate with another NE 6 [or the terminal 3 (or 1)] by utilizing the light source 214, without having the light source (E/O converter 73) provided in the first structure of the WDM transmission system.

Thus, in addition to the advantages of the first structure of the WDM transmission system, the size and cost of the NE 6 can be further reduced, compared with the first structure (idle-wavelength stopping structure). Furthermore, a dynamic wavelength adding-dropping control can be performed on an optical signal whose phase changes at all times.

The OADM node 2 can communicate with another station at the clock frequency of the self-station, utilizing the upstream light source 214. When busy signals from the downstream side conflict, the terminal 1 (or 3) selects any one of the stations that sent the busy signals, as with the first structure of the WDM transmission system. In this way, mediation control is performed.

The structure shown in FIG. 11 may be provided with the aforementioned optical signal source 4 (or 51) of the first structure (FIGS. 3 and 5) instead of the optical signal source 41a (or 51a). That is, an optical signal with a simple predetermined pattern (optical signal of a wavelength which may become an idle wavelength) is transmitted from the terminal 1 (or 3) to the terminal 3 (or 1) regardless of whether there is transmission data to be transmitted.

In the NE 6 (transponder 7), light with the above-described pattern is regarded as carrier light, and a reference transmission clock is detected from the carrier light at the O/E converter 71 and held by the PLL oscillator 72. In synchronization with the held reference transmission clock, an optical signal dropped by the OADM node 2 is modulated directly with self-transmission data by the LN modulator 75.

Thus, a reference transmission clock is extracted from the predetermined pattern received from the most upstream terminal 1 (or 3), and a transmission clock is generated from the reference transmission clock through the PLL oscillator 72 and supplied to the LN modulator 75. Therefore, operations of the entire WDM transmission system can be synchronized with each other by preventing the occurrence of an out-of-synchronism time. Since an optical signal can be freely added and dropped, a WDM transmission system with a high degree of freedom can be constructed.

In this case, when busy signals from the downstream side conflict, the most upstream terminal 1 (or 3) selects any one of the stations that sent the busy signals, and transmits transmission allowance. When an optical signal modulated by the LN modulator 75 is not a high-speed modulation signal, the logic high portions of the received light may be modulated at high speed at a node where the optical signal is received. In this case, the same wavelength used in the communication between upstream nodes can be further used in the communication between downstream nodes. Thus, wavelength resources can be effectively utilized according to traffic.

Figure 14:
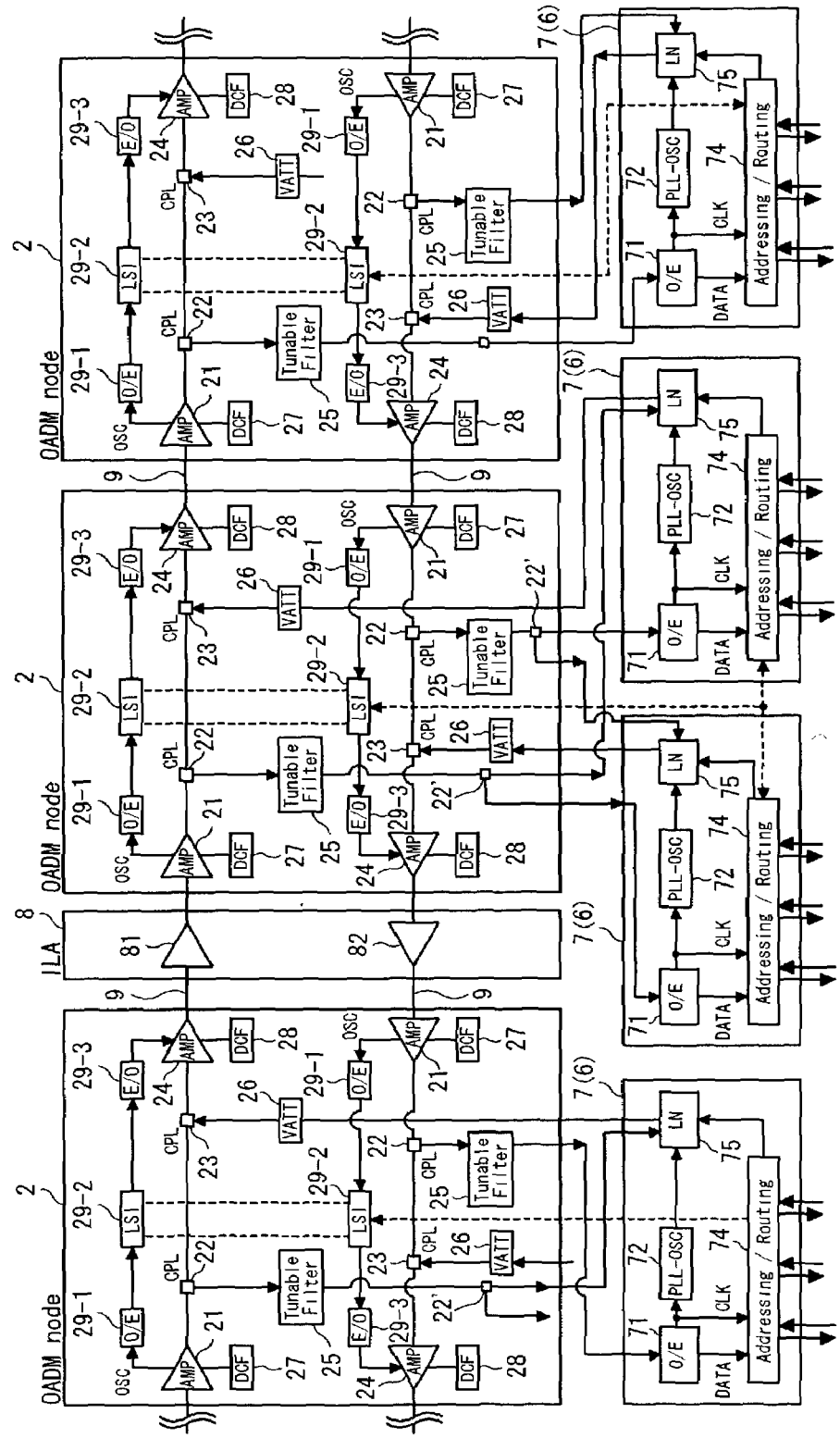
FIG. 14 is a block diagram showing a modification of the WDM transmission system shown in FIG. 11.

In the above-described example, the addressing/routing sections 74 of different NEs 6 (transponders 7) are interconnected through the communication line 77 so that an added or dropped signal can be transmitted between the different NEs 6. However, as shown in FIG. 14, an optical signal dropped by the optical coupler 22 and tunable filter 25 may be input to the O/E converter 71 of the transponder 7 of one NE 6 and to the LN modulator 75 of the transponder 7 of another NE 6 by an optical coupler 22'. In this case, the same function can be realized without employing the communication line 77.

(B) Others

In the above-described first and second structures of the WDM transmission system, when a plurality of wavelengths are added and dropped, a plurality of sets of the optical coupler 22 and tunable filter 25 are provided to correspond to the number of wavelengths to be dropped. In addition, a plurality of sets of the optical coupler 23 and variable attenuator 26 are provided to correspond to the number of wavelengths to be added, and a plurality of NEs 6 (transponders 7) are provided to correspond in number to the plurality of wavelengths.

Even in the case where wavelength bands for the WDM signal are a C-band of 1530 to 1570 nm and an L-band of 1570 to 1610 nm, and OADM nodes 2 separate received light into optical signals of C-band and L-band and perform optical amplification for each wavelength band, the same structure as FIGS. 3, 9, and 10 can be realized.

Figure 15:
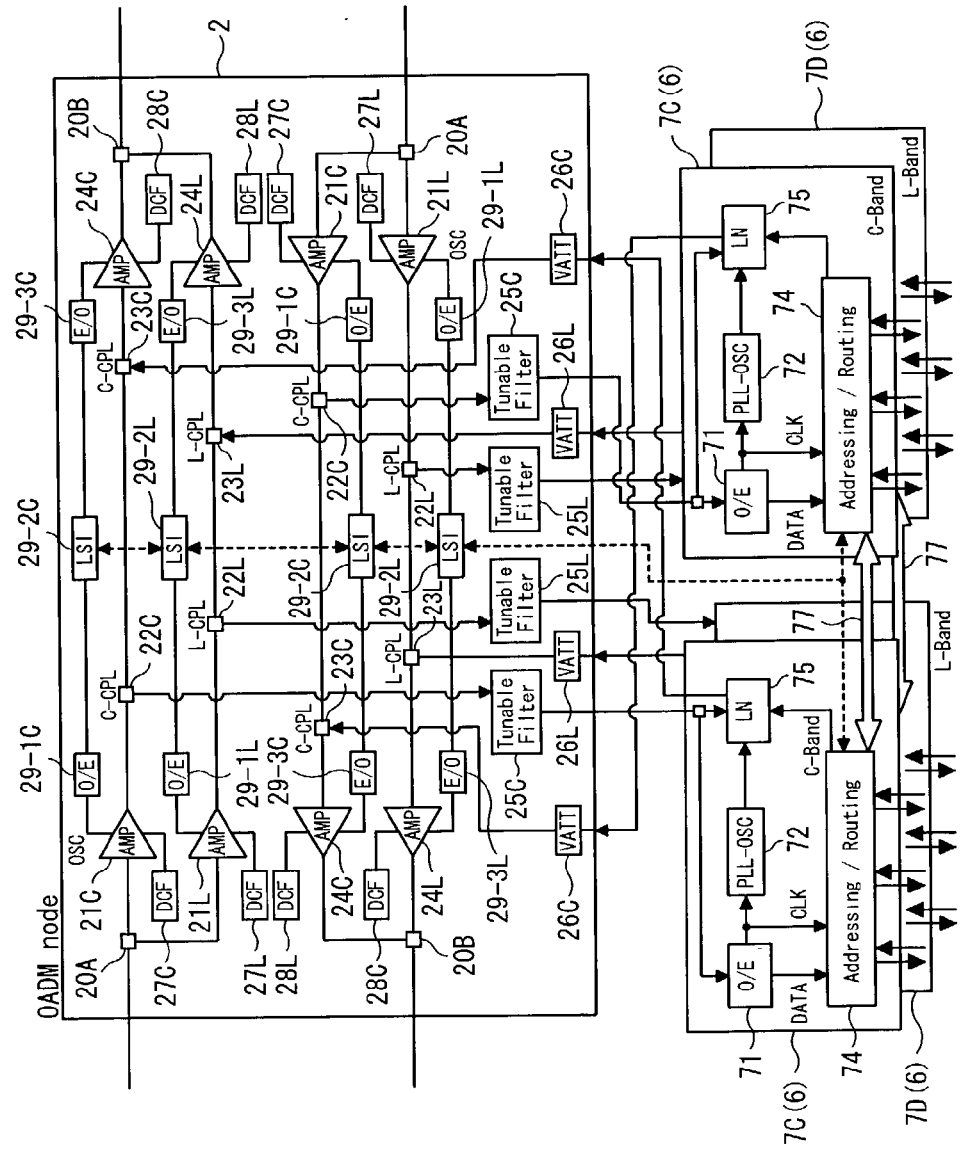
FIG. 15 is a block diagram showing a structure for the C-band and L-band of the OADM node and NE shown in FIG. 11.

For instance, in the case of the second structure (direct idle-wavelength modulating structure), a received optical signal is separated into an optical signal of C-band and an optical signal of L-band by an optical coupler 20A, as shown in FIG. 15. For the optical signals of C-band and L-band, there are provided optical amplifiers 21C/21L and 24C/24L, DCFs 27C/27L and 28C/28L, O/E converters 29-1C/29-L, LSIs 29-2C/29-2L, E/O converters 29-3C/29-3L, optical couplers 22C/22L, tunable filters 25C/25L, optical couplers 23C/23L, variable attenuators 26C/26L. With an optical coupler 20B, the optical signal of C-band and the optical signal of L-band are incorporated into a WDM signal.

An NE 6 is also provided with transponders 7C/7L for optical signals of C-band and L-band. With this structure, out-of-synchronism is prevented and direct modulation is performed. The same also applies to the first structure (idle-wavelength transmission stopping structure). For a WDM signal including a C-band and an L-band, the aforementioned advantages of the first and second structures are obtained for optical signals of C-band and L-band.

Figure 16:
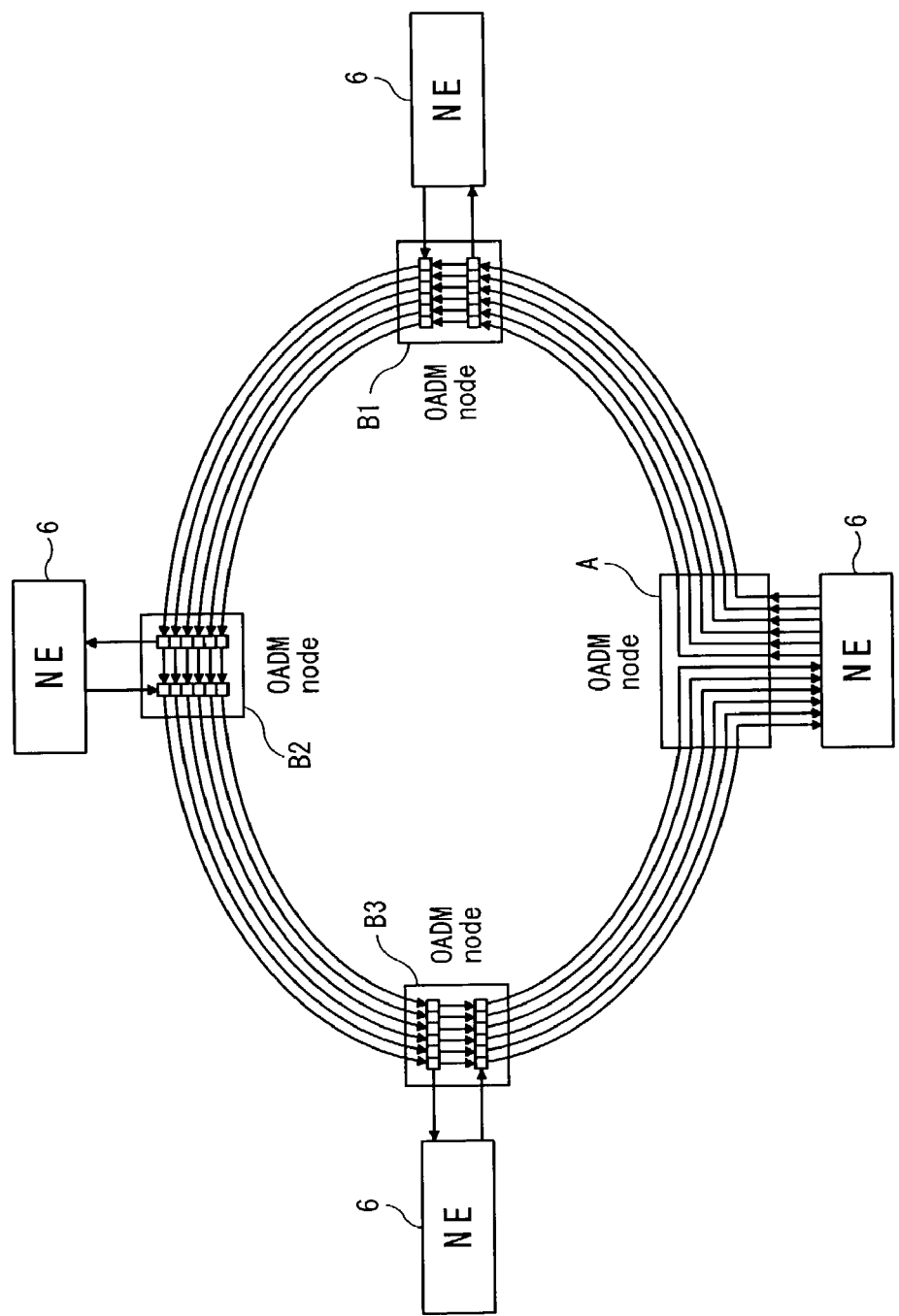
FIG. 16 is a block diagram showing an OADM ring network to which the present invention is applied.
Figure 17:
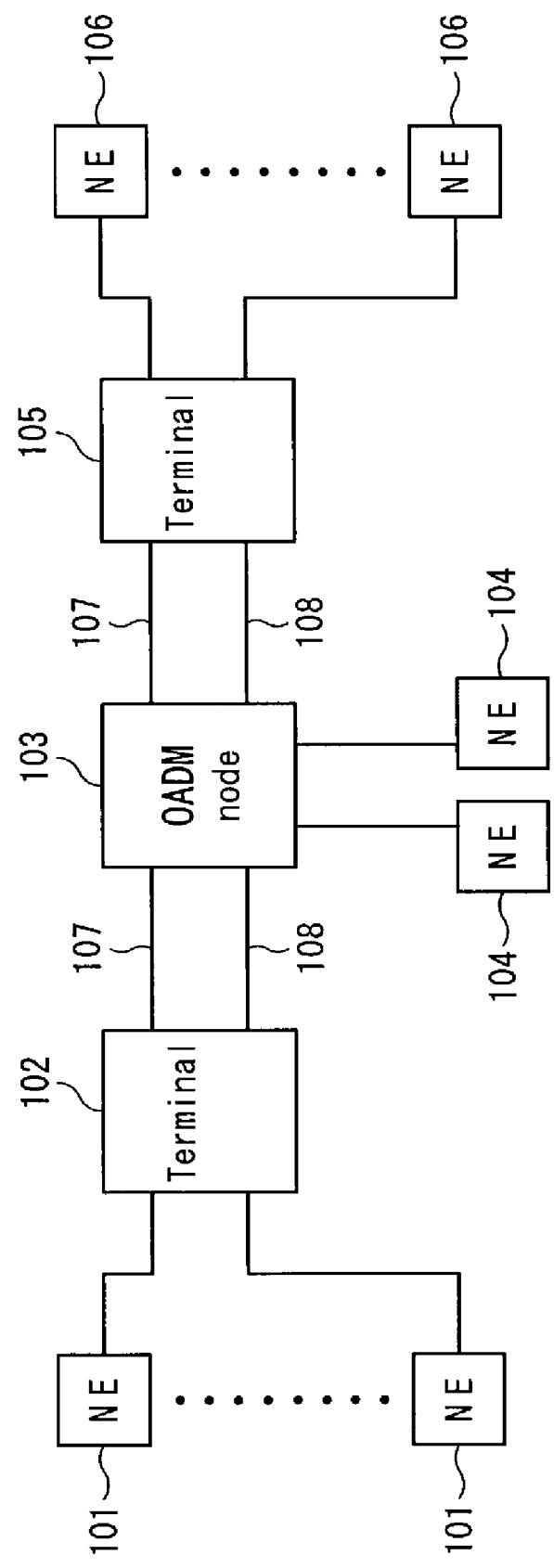
FIG. 17 is a block diagram showing a conventional WDM transmission system with a terminal-opposed structure.
Figure 18:
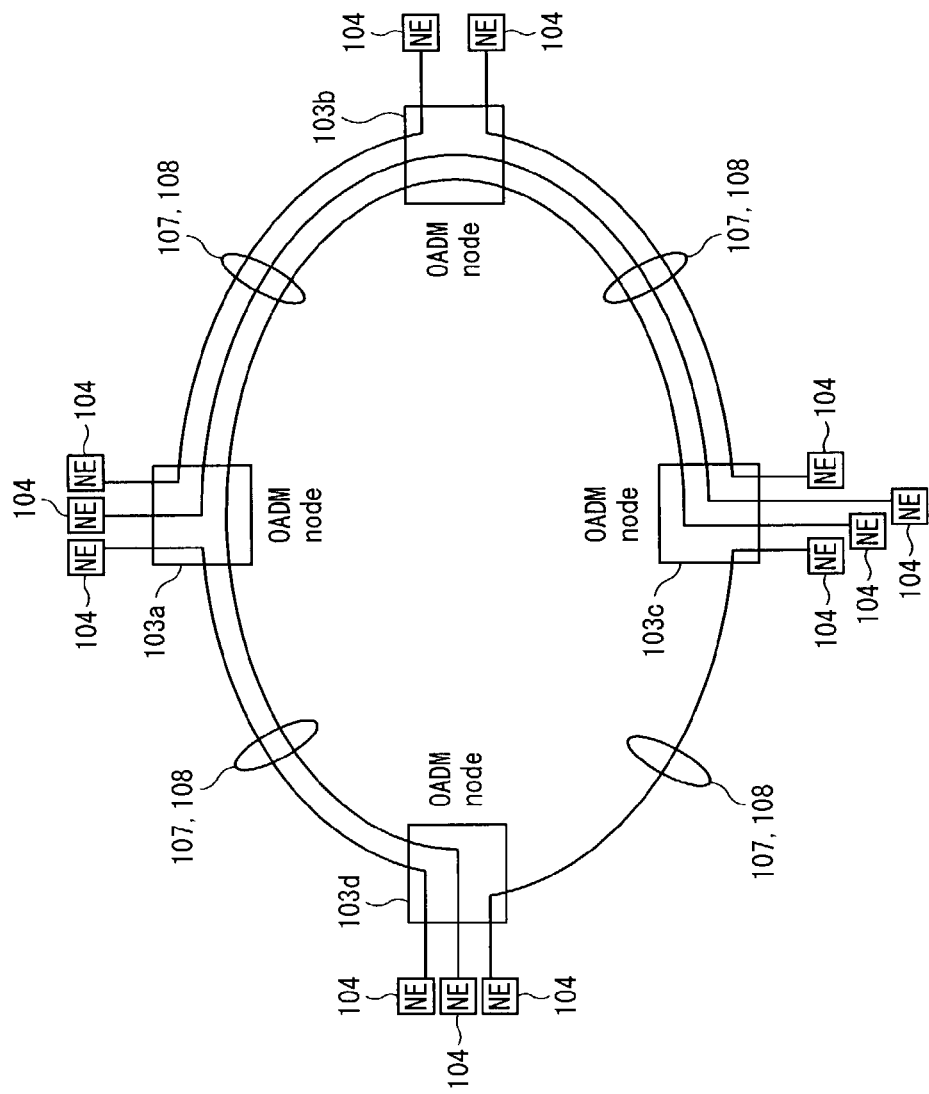
FIG. 18 is a block diagram showing a conventional WDM transmission system with a ring structure.

In the above-described first and second structures, the present invention is applied to the WDM transmission system having a terminal-opposed structure. However, the present invention is also applicable to a ring structure. In this case, only a specific OADM node within a ring-structured WDM transmission system (OADM ring network) shown in FIG. 16 is handled as a key node through which light of all wavelengths is passed. Only at the key node A, the OSNR and ASE light are monitored. The result of the monitoring is fed back to other nodes B1, B2, and B3. In this way, the state of optical signals in the entire ring structure are stably held.

In this case, the spectrum of a WDM signal can be monitored at only the key node A. The OADM nodes B1, B2, and B3 other than the key node A may have the structure shown in FIG. 2. Therefore, the monitor control information about the transmission state of a WDM signal does not need to be transmitted to each node through the OSC, as is transmitted in prior art. As a result, the size and cost of the OADM nodes B1, B2, and B3 can be substantially reduced. In addition, even if the size of the transmission system is increased, the transmission capacity of the OSC does not need to be increased.

While the present invention has been described with reference to the preferred embodiments thereof, the invention is not to be limited to the details given herein, but may be modified within the scope of the invention hereinafter claimed.

What is claimed is:

1. A signal transmission method in a wavelength-division-multiplex (WDM) transmission system, comprising the steps of:

transmitting a WDM signal from a first WDM terminal to a second WDM terminal regardless of whether an optical signal is added or dropped at an optical add-drop multiplexer (OADM) node; and transmitting adding data by a network element using a further optical signal of an idle wavelength of said WDM signal which has no transmission data, wherein the OADM node is adapted to transmit to the network element an optical signal of a specific wavelength of said WDM signal transmitted between said first and second WDM terminals, the OADM node is adapted to add to said WDM signal the further optical signal of an idle wavelength of said WDM signal received from said network element, said first WDM terminal stops transmission of an optical signal of an idle wavelength of said WDM signal which has no transmission data, said network element individually understands the idle wavelength of said WDM signal and transmits the adding data to said OADM node using an optical signal of the same addition wavelength as the idle wavelength individually understood by said network element and generated by the transmission stop, and said OADM node adds to said WDM signal the optical signal of the addition wavelength from said network element instead of the optical signal stopped by said first WDM terminal.

2. The signal transmission method as set forth in claim 1, wherein:

said network element outputs a transmission completion notification to said first WDM terminal, when the transmission of the adding data by the optical signal of the addition wavelength is completed; and said first WDM terminal restarts the transmission of the optical signal of the specific wavelength being stopped, in response to the reception of said transmission completion notification.

3. The signal transmission method as set forth in claim 2, wherein:

said first WDM terminal transmits an optical signal of a wavelength having a predetermined pattern to said second WDM terminal, regardless of whether there is transmission data; and said network element receives the optical signal having the predetermined pattern from said OADM node and holds the predetermined pattern, then transmits the predetermined pattern to said OADM node for a predetermined rime by the optical signal of the addition wavelength, before transmission of the adding data, and then transmits the optical signal of the addition wavelength with the adding data to said OADM node.

4. The signal transmission method as set forth in claim 2, wherein:

an optical signal of each wavelength of said WDM signal is transmitted from said firs WDM terminal to said second WDM terminal regardless of the dropping of wavelength at said OADM node; and said second WDM terminal collectively monitors the signal quality of the optical signal of each wavelength of said WDM signal passed through said OADM node, and based on the result of the monitoring, controls the transmission level of each wavelength of said WDM signal at one or both of said first WDM terminal and OADM node, or both.

5. The signal transmission method as set forth in claim 2, wherein said first WDM terminal fixedly transmits a prevention signal for continuing transmission even when transmission of optical signals of all wavelengths of said WDM signal is stopped.

6. The signal transmission method as set forth in claim 1, wherein:

said first WDM terminal transmits an optical signal of an idle wavelength having a predetermined pattern to said second WDM terminal, regardless of whether there is transmission data; and said network element receives the optical signal having the predetermined pattern from said OADM node and holds the predetermined pattern of the optical signal of the idle wavelength, then transmits the predetermined pattern to said OADM node for a predetermined time by the optical signal of the addition wavelength, before transmission of the adding data, and then transmits the optical signal of the addition wavelength with the adding data to said OADM node.

7. The signal transmission method as set forth in claim 6, wherein:

an optical signal of each wavelength of said WDM signal is transmitted from said first WDM terminal to said second WDM terminal regardless of the dropping of wavelength am said OADM node; and said second WDM terminal collectively monitors the signal quality of the optical signal of each wavelength of said WDM signal passed through said OADM node, and based on the result of the monitoring, controls the transmission level of each wavelength of said WDM signal at one or both of said first WDM terminal and OADM node.

8. The signal transmission method as set forth in claim 6, wherein:

said first WDM terminal stepwise lowers the optical transmission level of the optical signal of the idle wavelength having said predetermined pattern and stops the transmission; and said network element stepwise raises the transmission level of the optical signal of the addition wavelength having said predetermined pattern with respect to said OADM node, for said predetermined time.

9. The signal transmission method as set forth in claim 6, wherein said first WDM terminal fixedly transmits a prevention signal for continuing transmission even when transmission of optical signals of all wavelengths of said WDM signal is stopped.

10. The signal transmission method as set forth in claim 6, wherein:

said first WDM terminal transmits an optical signal with a rectangular wave, as said predetermined pattern; and said network element holds the rectangular wave of the optical signal of the idle wavelength received from said OADM node, as a reference transmission clock, and after said predetermined time, transmits said adding data to said OADM node in synchronization with said reference transmission clock by the optical signal of the addition wavelength.

11. The signal transmission method as set forth in claim 1, wherein:

an optical signal of each wavelength of said WDM signal is transmitted from said first WDM terminal to said second WDM terminal regardless of the dropping of wavelength at said OADM node; and said second WDM terminal collectively monitors the signal quality of the optical signal of each wavelength of said WDM signal passed through said OADM node, and based on the result of the monitoring, controls the transmission level of each wavelength of said WDM signal at one or both of said first WDM terminal and OADM node.

12. The signal transmission method as set forth in claim 11, wherein said first WDM terminal fixedly transmits a prevention signal for continuing transmission even when transmission of optical signals of all wavelengths of said WDM signal is stopped.

13. The signal transmission method as set forth in claim 11, wherein:

said first WDM terminal transmits an optical signal with a rectangular wave, as said predetermined pattern; and said network element holds the rectangular wave of the optical signal of the idle wavelength received from said OADM node, as a reference transmission clock, and after said predetermined time, transmits said adding data to said OADM node in synchronization with said reference transmission clock by the optical signal of the addition wavelength.

14. The signal transmission method as set forth in claim 1, wherein said first WDM terminal fixedly transmits a prevention signal for continuing transmission even when transmission of optical signals of all wavelengths of said WDM signal is stopped.

15. The signal transmission method as set forth in claim 1, wherein:

if said first WDM terminal receives a plurality of transmission allowance requests for the same idle wavelength from a plurality of network elements, in case of a plurality of OADM nodes are provided between said first WDM terminal and said second WDM terminal and said plurality of network elements are provided to correspond to said plurality of OADM nodes;

said first WDM terminal selects one of said network elements and gives a transmission allowance of said adding data to the selected network element; and said selected network element transmits said data in response to the reception of said transmission allowance.

16. A signal transmission method in a wavelength-division-multiplex (WDM) transmission system, comprising the steps of:

transmitting a WDM signal from a first WDM terminal to a second WDM terminal regardless of whether an optical signal is added or dropped at an optical add-drop multiplexer (OADM) node; and transmitting adding data by a network element using a further optical signal of an idle wavelength of said WDM signal which has no transmission data, wherein the OADM node is adapted to transmit to the network element an optical signal of a specific wavelength of said WDM signal transmitted between said first and second WDM terminals, the OADM node is adapted to add to said WDM signal the further optical signal of an idle wavelength of said WDM signal received from said network element, in said network element, an optical signal of an idle wavelength having no transmission data to be transmitted by said first WDM terminal, among said WDM signal passed through said OADM node, is modulated with the adding data, and said network element individually understands the idle wavelength of said WDM signal.

17. The signal transmission method as set forth in claim 16, wherein:

said first WDM terminal transmits an optical signal of an idle wavelength having a predetermined pattern to said second WDM terminal, regardless of whether there is transmission data to be transmitted by said first WDM terminal; and said network element receives the optical signal of the idle wavelength from said OADM node, directly modulates the optical signal of the idle wavelength with said adding data in synchronization with the predetermined pattern of the optical signal of the idle wavelength, and transmits the optical signal of the idle wavelength obtained by the direct modulation to said OADM node.

18. The signal transmission method as set forth in claim 17, wherein said first WDM terminal transmits an optical signal with a rectangular wave, as said predetermined pattern.

19. The signal transmission method as set forth in claim 17, wherein:

if said first WDM terminal receives a plurality of transmission allowance requests for the same idle wavelength from a plurality of network elements, in case of a plurality of OADM nodes are provided between said first WDM terminal and said second WDM terminal and said plurality of network elements are provided to correspond to said plurality of OADM nodes;

said first WDM terminal selects one of said network elements and gives a transmission allowance of said adding data to the selected network element; and said selected network element transmits said adding data in response to the reception of said transmission allowance.

20. A first wavelength-division-multiplex (WDM) terminal for use in a WDM transmission system which comprises said first WDM terminal for transmitting a WDM signal, a second WDM terminal for receiving said WDM signal, and an optical add-drop multiplexer (OADM) node for transmitting to a network element an optical signal of a specific wavelength of said WDM signal transmitted between said first and second terminals and for adding to said WDM signal an optical signal of an idle wavelength of said WDM signal received from said network element, said first WDM terminal comprising:

WDM-signal transmission means for transmitting said WDM signal;

transmission control means for stopping transmission of an optical signal of an idle wavelength of said WDM signal which has no transmission data; and transmission-allowance issuing means for allowing said network element to transmit adding data using an optical signal of the same addition wavelength as an idle wavelength generated by stopping transmission of the optical signal of the idle wavelength by said transmission control means, and allowing said network element to transmit the optical signal of the addition wavelength to said OADM node, wherein said network element individually understands the idle wavelength of said WDM signal.

21. The first WDM terminal as set forth in claim 20, wherein said transmission control means is equipped with a restart control section which receives from said network element a transmission completion notification that transmission of said data has been completed by said network element, and then controls WDM-signal transmission means so that the transmission of the optical signal of the idle wavelength being stopped is restarted.

22. The first WDM terminal as set forth in claim 21, wherein said WDM-signal transmission means is equipped with a predetermined-pattern transmitting section for transmitting an optical signal of an idle wavelength having a predetermined pattern to said second WDM terminal, regardless of whether there is said transmission data.

23. The first WDM terminal as set forth in claim 21, wherein said WDM-signal transmission means is equipped with a prevention-signal transmitting section which fixedly transmits a prevention signal for continuing transmission, even when optical signals of all wavelengths of said WDM signal are in an idle state and transmission of the optical signals of all wavelengths of said WDM signal is stopped.

24. The first WDM terminal as set forth in claim 21, wherein said transmission control means is equipped with a mediation control section which controls said transmission-allowance issuing means so that a transmission allowance of said adding data is given one of network elements, if a plurality of transmission allowance requests forte same idle wavelength are received from a plurality of network elements, in case of a plurality of OADM nodes are provided between said first WDM terminal and said second WDM terminal and said network elements are provided to correspond to said plurality of OADM nodes.

25. The first WDM terminal as set forth in claim 21, wherein a predetermined-pattern transmitting section is configured to transmit an optical signal with a rectangular wave, as a predetermined pattern.

26. The first WDM terminal as set forth in claim 20, wherein said WDM-signal transmission means is equipped with a predetermined-pattern transmitting section for transmitting an optical signal of an idle wavelength having a predetermined pattern to said second WDM terminal by, regardless of whether there is said transmission data.

27. The first WDM terminal as set forth in claim 26, wherein said transmission control means is equipped with a transmission level control section which stepwise lowers the transmission level of the optical signal of the idle wavelength having said predetermined pattern and stops the transmission.

28. The first WDM terminal as set forth in claim 26, wherein said WDM-signal transmission means is equipped with a prevention-signal transmitting section which fixedly transmits a prevention signal for continuing transmission, even when optical signals of all wavelengths of said WDM signal are in an idle state and transmission of the optical signals of all wavelengths of said WDM signal is stopped.

29. The first WDM terminal as set forth in claim 26, wherein said transmission control means is equipped with
a mediation control section which controls said transmission-allowance issuing means so that a transmission allowance of said adding data is given one of network elements, if a plurality of transmission allowance requests for the same idle wavelength are received from a plurality of network elements, in case of a plurality of OADM nodes are provided between said first WDM terminal and said second WDM terminal and said network elements are provided to correspond to said plurality of OADM nodes.

30. The first WDM terminal as set forth in claim 26, wherein said predetermined-pattern transmitting section is configured to transmit an optical signal with a rectangular wave, as said predetermined pattern.

31. The first WDM terminal as set forth in claim 20, wherein said WDM-signal transmission means is equipped with a prevention-signal transmitting section which fixedly transmits a prevention signal for continuing transmission, even when optical signals of all wavelengths of said WDM signal are in an idle state and transmission of the optical signals of all wavelengths of said WDM signal is stopped.

32. The first WDM terminal as set forth in claim 31, wherein said transmission control means is equipped with
a mediation control section which controls said transmission-allowance issuing means so that a transmission allowance of said adding data is given one of network elements, if a plurality of transmission allowance requests for the same idle wavelength are received from a plurality of network elements, in case of a plurality of OADM nodes are provided between said first WDM terminal and said second WDM terminal and said network elements are provided to correspond to said plurality of OADM nodes.

33. The first WDM terminal as set forth in claim 31, wherein a predetermined-pattern transmitting section is configured to transmit an optical signal with a rectangular wave, as a predetermined pattern.

34. The first WDM terminal as set forth in claim 20, wherein said transmission control means is equipped with
a mediation control section which controls said transmission-allowance issuing means so that a transmission allowance of said adding data is given one of network elements, if a plurality of transmission allowance requests for the same idle wavelength are received from a plurality of network elements, in case of a plurality of OADM nodes are provided between said first WDM terminal and said second WDM terminal and said network elements are provided to correspond to said plurality of OADM nodes.

35. A network element for use in a wavelength-division-multiplex (WDM) transmission system which comprises a first WDM terminal for transmitting a WDM signal, a second WDM terminal for receiving said WDM signal, and an OADM node for transmitting to said network element an optical signal of a specific wavelength of said WDM signal transmitted between said first and second terminals and for adding to said WDM signal an optical signal of an idle wavelength of said WDM signal received from said network element,
said network element comprising:
optical-signal receiving means for receiving an optical signal of an idle wavelength of said WDM signal dropped from said OADM node and having no transmission data to be transmitted by said first WDM terminal; and
optical-signal transmitting means for transmitting an optical signal to said OADM, which signal has adding data to be added to said WDM signal and the same addition wavelength as the idle wavelength generated by stopping transmission of the optical signal of the idle wavelength having no transmission data at said first WDM terminal, wherein:
said optical-signal receiving means is equipped with a predetermined-pattern holding section which holds a predetermined pattern of an optical signal of the idle wavelength transmitted by said first WDM terminal regardless of whether there is the transmission data; and said optical-signal transmitting means is equipped with an optical-signal generating section which generates the optical signal of the addition wavelength to be transmitted to said OADM node,
an optical modulation section which modulates the optical signal generated by optical-signal generating section, with said adding data in synchronization with the predetermined pattern held by said predetermined-pattern holding section and transmits the modulated signal to said OADM node, and
said network element individually understands the idle wavelength of said WDM signal.

36. The network element as set forth in claim 35, wherein said optical-signal transmitting means is equipped with a predetermined-pattern transmitting section which transmits said predetermined pattern held by said predetermined-pattern holding section to said OADM node for a predetermined time using the optical signal of the addition wavelength, before the transmission of said adding data to said OADM node.

37. The network element as set forth in claim 36, wherein said optical-signal transmitting means is equipped with a transmission level control section which stepwise raises the transmission level of the optical signal of the addition wavelength having said predetermined pattern for said predetermined time.

38. The network element as set forth in claim 36, wherein said optical-signal transmitting means is configured to transmit the optical signal of the addition wavelength to said OADM node in response to transmission allowance from said first WDM terminal.

39. The network element as set forth in claim 35, wherein said optical-signal transmitting means is configured to transmit the optical signal of the addition wavelength to said OADM node in response to transmission allowance from said first WDM terminal.

40. The network element as set forth in claim 39, wherein a predetermined-pattern holding section is configured to hold a rectangular wave as a predetermined pattern.

41. The network element as set forth in claim 40, wherein said optical-signal transmitting means is configured to transmit the optical signal with said adding data to said OADM node in response to transmission allowance from said first WDM terminal.

42. A network element for use in a wavelength-division-multiplex (WDM) transmission system which comprises a first WDM terminal for transmitting a WDM signal, a second WDM terminal for receiving said WDM signal, and an OADM node for transmitting to said network element an optical signal of a specific wavelength of said WDM signal transmitted between said first and second terminals and for adding to said WDM signal an optical signal of an idle wavelength of said WDM signal received from said network element, said network element comprising:

optical-signal receiving means for receiving an optical signal of an idle wavelength of said WDM signal dropped from said OADM node and having no transmission data to be transmitted by said first WDM terminal; and optical-signal transmitting means for adding data to be added to said WDM signal, to the optical signal of the idle wavelength received by said optical-signal receiving means, and for transmitting the optical signal of the idle wavelength to said OADM node, wherein:

said optical-signal receiving means is equipped with a predetermined-pattern holding section which holds a predetermined pattern of an optical signal of the idle wavelength transmitted by said first WDM terminal, regardless of whether there is the transmission data, said optical-signal transmitting means is equipped with a direct optical modulation section which modulates the optical signal of the idle wavelength received by the optical-signal receiving means, with said second transmission data in synchronization with the predetermined pattern held by said predetermined-pattern, holding section and transmits the modulated signal to said OADM node, and said network clement individually understands the idle wavelength of said WDM signal.

43. The network element as set forth in claim 42, wherein said predetermined-pattern holding section is configured to hold a rectangular wave as said predetermined pattern.

44. The network element as set forth in claim 42, wherein said optical-signal transmitting means is configured to transmit the optical signal with said adding data to said OADM node in response to transmission allowance from said first WDM terminal.

45. A network element for use in a wavelength-division-multiplex (WDM) transmission system which comprises a first WDM terminal for transmitting a WDM signal, a second WDM terminal for receiving said WDM signal, and an OADM node for transmitting to said network element an optical signal of a specific wavelength of said WDM signal transmitted between said first and second terminals and for adding to said WDM signal an optical signal of an idle wavelength of said WDM signal received from said network element, said network element comprising:

optical-signal receiving means for receiving an optical signal of an idle wavelength of said WDM signal dropped from said OADM node and having no transmission data to be transmitted by said first WDM terminal; and optical-signal transmitting means for adding data to be added to said WDM signal, to the optical signal of the idle wavelength received by said optical-signal receiving means, and for transmitting the optical signal of the idle wavelength to said OADM node, wherein a predetermined-pattern holding section is configured to hold a rectangular wave as a predetermined pattern, and said network element individually understands the idle wavelength of said WDM signal.

46. The network element as set forth in claim 45, wherein said optical-signal transmitting means is configured to transmit the optical signal with said adding data to said OADM node in response to transmission allowance from said first WDM terminal.

47. A network element for use in a wavelength-division-multiplex (WDM) transmission system which comprises a first WDM terminal far transmitting a WDM signal, a second WDM terminal for receiving said WDM signal, and an OADM node for transmitting to said network element an optical signal of a specific wavelength of said WDM signal transmitted between said first and second terminals and for adding to said WDM signal an optical signal of an idle wavelength of said WDM signal received from said network element, said network element comprising:

optical-signal receiving means for receiving an optical signal of an idle wavelength of said WDM signal dropped from said OADM node and having no transmission data to be transmitted by said first WDM terminal; and optical-signal transmitting means for adding data to be added to said WDM signal, to the optical signal of the idle wavelength received by said optical-signal receiving means, and for transmitting the optical signal of the idle wavelength to said OADM node, wherein said optical-signal transmitting means is configured to transmit the optical signal with said adding data to said OADM node in response to transmission allowance from said first WDM terminal, and said network element individually understands the idle wavelength of said WDM signal.

* * * * *